(12) United States Patent  
Miller et al.

(10) Patent No.: US 11,599,127 B2  
(45) Date of Patent: Mar. 7, 2023

(54) DEVICE OR SYSTEM OF METHOD FOR REMOTE MONITORING AND/OR ACTIVITY

(71) Applicant: HayBeeSee Ltd, London (GB)

(72) Inventors: Frederick Miller, London (GB); Mirko Kovac, London (GB); Robert James Douglas Siddall, London (GB)

(73) Assignee: HayBeeSee Ltd, London (GB)

( * ) Notice: Subject to any disclaimer, the term of this patent is extended or adjusted under 35 U.S.C. 154(b) by 332 days.

(21) Appl. No.: 16/757,240

(22) PCT Filed: Oct. 18, 2018

(86) PCT No.: PCT/EP2018/078622  
§ 371 (c)(1),  
(2) Date: Apr. 17, 2020

(87) PCT Pub. No.: WO2019/077070  
PCT Pub. Date: Apr. 25, 2019

(65) Prior Publication Data  
US 2020/0278696 A1    Sep. 3, 2020

(30) Foreign Application Priority Data  
Oct. 18, 2017    (GB) ..................................... 1717137

(51) Int. Cl.  
*G05D 1/06*    (2006.01)  
*B64C 39/02*    (2023.01)

(52) U.S. Cl.  
CPC ......... *G05D 1/0676* (2013.01); *B64C 39/024* (2013.01); *G05D 1/0669* (2013.01); *B64C 2201/088* (2013.01); *B64C 2201/108* (2013.01); *B64C 2201/127* (2013.01); *B64C 2201/18* (2013.01)

(58) Field of Classification Search  
CPC .. G05D 1/0676; G05D 1/0669; B64C 39/024; B64C 2201/088; B64C 2201/108; B64C 2201/127; B64C 2201/18  
See application file for complete search history.

(56) References Cited

U.S. PATENT DOCUMENTS

| 1,254,898 A | 1/1918 | Frost |
| 8,948,935 B1 | 2/2015 | Peeters et al. |

(Continued)

FOREIGN PATENT DOCUMENTS

| CN | 107128479 A | 9/2017 |
| WO | 2016193667 A1 | 12/2016 |

(Continued)

OTHER PUBLICATIONS

M. Kovac et al., "The EPFL Jumpglider: A Hybrid Jumping and Gliding Robot with Rigid or Folding Wings," EEE International Conference on Robotics and Biomimetics (ROBIO), Dec. 1, 2011, pp. 1503-1508.

*Primary Examiner* — Hussein Elchanti  
(74) *Attorney, Agent, or Firm* — Ryan, Mason & Lewis, LLP

(57) ABSTRACT

An autonomous remote device for deployment in an area, comprising: a mechanism for launching the device airborne from a first of a plurality of locations; a mechanism for navigating the device when airborne to a second of the plurality of locations; and a mechanism for landing the device at the second of the plurality of locations.

18 Claims, 21 Drawing Sheets

(56) References Cited

U.S. PATENT DOCUMENTS

| | | | |
|---|---|---|---|
| 9,668,146 B2 | 5/2017 | Lan | |
| 10,466,700 B1* | 11/2019 | Carmack | H04K 3/224 |
| 11,352,131 B2* | 6/2022 | Bosworth | B64C 25/58 |
| 2016/0313742 A1* | 10/2016 | Wang | A63H 27/12 |
| 2016/0364989 A1 | 12/2016 | Speasl et al. | |
| 2017/0197714 A1* | 7/2017 | Golden | B60F 5/02 |
| 2017/0199528 A1* | 7/2017 | Detweiler | G05D 1/0646 |
| 2017/0328513 A1* | 11/2017 | Davis | B64F 5/60 |
| 2017/0355453 A1* | 12/2017 | Kim | B64D 47/08 |
| 2018/0061148 A1* | 3/2018 | Dudar | G05D 1/0094 |
| 2018/0186472 A1* | 7/2018 | Wan | H04N 5/23238 |
| 2018/0281933 A1* | 10/2018 | Davis | B64C 25/04 |
| 2018/0292817 A1* | 10/2018 | Yang | G08G 5/0026 |
| 2019/0002127 A1* | 1/2019 | Straus | B64F 1/12 |
| 2019/0084670 A1* | 3/2019 | Sharma | B64C 39/024 |

FOREIGN PATENT DOCUMENTS

| | | |
|---|---|---|
| WO | 2017019728 A1 | 2/2017 |
| WO | PCT/EP2018/078622 | 3/2019 |

\* cited by examiner

Side legs extend and retract, to orient the drone

Jumping Sequence Illustrated
Drone resting and spring charging

Jumping Sequence Illustrated
Phase 1 - Drone resting and spring charging

Phase 2 - Side legs extend and retract, to orient the drone

Phase 3 - Spring and jumping mechanism activates, providing large impulse to drone main leg for lift off

DEVICE OR SYSTEM OF METHOD FOR REMOTE MONITORING AND/OR ACTIVITY

The invention is concerned with a device, and/or system and/or method for remote monitoring and/or activity. A disclosed device can operate remotely and autonomously to inspect an area to accumulate data and/or perform an activity in an area. The device can be configured to move within an area between points, and at each point perform the inspection and/or action. A system can incorporate such a device. A method can utilise such a device or a system incorporating such device, to provide enhances data.

It is known for a tractor to spray an entire field. This is costly and limited to infrequent usage.

It is known for a UAV (unmanned aerial vehicle) to scan a field and provide a data-map, this is low in data or image quality and provided too late to be actionable e.g. for tractor spraying.

It is known for an area to be checked by quad bike and plucking. This is very inefficient and laborious.

It is known for crop dusting—aerial application. This is expensive and inaccurate.

It is an aim of the invention to provide an improvement.

There is provided a device which moves between a plurality of fixed locations in area in order to monitor the locations and/or perform an action at the locations.

The device may be a robot or a drone.

The device preferably moves between each location by launching or taking-off from one location, flying to another location, and then landing at that location.

A module may be provided to control the device during launching or take-off. The device may be provided with a spring loaded leg which is actuated for launch or take-off. In such case the spring leg may be orientated to ensure when it is deployed after landing, it is deployed to contact the ground opposite the direction of launch or take-off, so it is a trailing leg on launch of take-off. The device may be provided with a compressed gas mechanism which can be actuated for launch or take-off. The device may be configured as a drone for this launch or take-off, and be controlled as a drone for launch or take-off. One, some or all of these mechanisms may be utilised for launch or take-off.

A module may be provided to control the device during flying, to navigate it from one location to the next. The device may be configured as a drone for this flying, and be controlled as a drone.

A module may be provided to control the device during landing. The device may be configured as a drone for this landing, and controlled as a drone for landing. The device may be provided with legs for stability when landed. The device may be provided with three legs for stability of landing. The legs may be adjustable in order to adjust the device on landing. The device may have an anchor leg for stability on landing, in addition or instead of other legs. Any legs may be provided with platforms to present sinking into the ground.

The device may be provided with a rotatable arm. When landed, and in a stable position, the legs may be adjusted to ensure that the rotatable arm can rotate to cover a 360° rotation substantially parallel to the ground. The legs may be adjusted to ensure such rotation, if the device cannot be landed to provide such rotation. There may be two rotatable arms, extending radially from a central body, with each arm covering a rotation of 180°, ±90° from its normal position.

The device may be provided with a number of rotors to enable it to operate as a drone, preferably providing four rotors located at 90° with respect to each other, at radially displaced locations from a central body.

Preferably the rotatable arm or arms rotate in a plane parallel to the plane of the rotors.

The device may be provided with one or more solar panels, and/or one or more rechargeable batteries.

The device may be controlled to move along a pathway between multiple locations within an area. At each location the device may perform a monitoring operation followed by deploying an action responsive to the monitoring.

The device may be controlled to move along the pathway in dependence on points within the area having been determined, and the pathway connecting all the points.

The device may be controlled to move along a pathway in dependence on the points within the pathway having been determined by analysis of image data from satellite observation. The satellite data thus may dictate the movements of the device within the area. At each point an action may be deployed.

At each point an image may be captured to enhance the image data. An enhanced imaging map of the area is therefore established. At each point an image may be captured and an action may be deployed. The device may be associated with one or more interface devices.

The interface devices may be provided with modules, which modules may be affixed to the device. The device may be controlled to move along a pathway between points in the area, and in addition the pathway includes one or more interface devices. At an interface device one or more module may be attached to the device and/or removed from the device.

The interface devices may be recharging stations. The device may be controlled to move along a pathway between points in the area, and in addition the pathway includes one or more interface devices. At an interface device a rechargeable battery of the device may be removed and replaced with a charged rechargeable battery. The interface device may recharge any removed rechargeable battery.

The autonomous remote device may comprise a module for determining the location of the device.

The autonomous remote device may be configured to move between a plurality of locations.

The autonomous remote device may comprising a module for determining locations within the area for the device to move between, The autonomous remote device may further be configured for use in an agricultural environment, and/or a rural location, and/or remote location.

The autonomous remote device may further be configured to be used for repeated observation within the area to create a phenotypic model for the area, for prediction or for analysis.

The autonomous remote device may further comprise a set of legs which arrest the flight instead of motors.

The autonomous remote device may further comprise a set of legs which can extend and absorb shocks The autonomous remote device may further comprise a set of legs which can minimise damage to crops.

Arm may be foldable. Arm may be telescopic.

The deployment arm may have devices moving up and down wiping weeds or doing actions or sensing.

The deployment arm may have a camera or cameras inside. The deployment arm may have a camera or cameras attached thereto.

The autonomous remote device may further comprising a weed wiper which has a delta/linkage arm for wiping using a sponge and pump.

The mechanism for launching the device may include a leg which during navigation and landing is retracted.

The autonomous remote device may further comprise a non-slip protrusion on a leg which includes multiple feet which may be changed for better distribution of force in varying soils or terrains and minimisation of crop damage.

The autonomous remote device may be adjusted in a direction for optimal take-off and contact with terrain.

The autonomous device may further be provided with a jumping mechanism.

The autonomous device may further be configured to determine the missing links in the phenotyping model The autonomous device may further be configured to collate observations to create a phenotyping model or plant trait model.

The autonomous device may further be configured to initiate actions based on phenotyping model and repeated visits The autonomous device may further be configured to provide predictions or analysis using phenotyping model There may be provided a system for controlling an autonomous remote device for monitoring an area, comprising: a module for tracking locations within an area and for tracking the location of the device within that area; a mechanism for determining a pathway for the device between multiple static locations within the area, such that if the device is located at each static location, the whole area will be monitored; a mechanism for moving the device between the multiple static locations along the pathway; and a mechanism for deploying monitoring at each static location.

The system may be configured to receive imaging data of the area from a satellite, and the monitoring performed at each static location is to enhance the imaging data from the satellite.

There may be provided a system for controlling an autonomous remote device, comprising: a module for tracking locations within an area and for controlling the location of the device within that area; a module for determining a pathway for the device between multiple static locations within the area; a module for receiving data based on satellite images of the area; a module for controlling the movement of the device between the multiple static locations along the pathway in dependence on the satellite images of the area; and a module for controlling an action at each static location.

The action may be to capture an image, and thereby enhance the imaging data provided by the satellite images. The action may be to deploy a robotic action.

There may be provided a system for controlling an autonomous remote device, comprising: a module for tracking locations within an area and for positioning the device within that area; a module for determining a pathway for the device between multiple static locations within the area; and a module for moving the device between the multiple static locations along the pathway.

The system may further comprise one or more interface units associated with the area, wherein the module for determining pathway for the device further incorporates the positions of the one or more interface units. The one or more interface units may be stations at which modular attachments to the device can be adjusted. The one or more interfaces may be stations at which a rechargeable battery of the device can be replaced and recharged. The one or more interfaces may be stations at which a chemical refill operation id conducted. Chemical refill may be cartridges or capsules. Any other exchange of fluids or solids which are not chemicals, like additional wipes or materials, may take place.

The system may be configured to receive imaging data of the area from a satellite, and the monitoring performed at each static location is to enhance the imaging data from the satellite.

There is provided a system for controlling an autonomous remote device for monitoring an area, comprising: a mechanism for receiving a satellite image of an area; a mechanism for analysing the satellite image; a mechanism for identifying a discrepancy in the analysed image; a mechanism for deploying a monitoring device to the area of the analysed image; a mechanism within the monitoring device for determining a pathway for inspection in dependence on the satellite image.

There is provided a system for monitoring an area utilising a monitoring device movable between locations within the area, wherein the device uses a rechargeable power source, a pathway for the movable device including at least one location at which a recharging interface for the rechargeable energy source is provided.

There is provided a system for monitoring an area utilising a monitoring device movable between locations within the area, wherein the device uses modular components, a pathway for the movable device including at least one location at which a modular component can be either removed, added, or replaced.

There is provided a system for monitoring an area utilising a plurality of monitoring devices movable between locations within the area, wherein each device is provided with a means for communication such that each device follows a pathway between location points within the area, such that each location is only included within the pathway of one device.

Each device may be termed a hopper. A hopper can be used in swarm configuration. A swarm can consist of hopper machines and tractors or any other device, such that the hopper can be configured to inform the operations of other devices like tractors.

The system can generally be configured to receive and/or enhance a UAV data sets, a satellite data set or ground data set.

There is provided a device for monitoring and/or engaging to action comprising: a mechanism for moving the device between locations; a mechanism for monitoring and/or engaging to action which is enabled when the device is stationary at a location.

The device may be for monitoring, wherein at each location the device is configured to deploy a sensing means to sense data at the location. The sensing means may be a camera. The data may be images of the location.

The device may be configured to transmit the sensed data to a further entity.

The device may be for engaging to action, wherein at each location the device is configured to carry out an action. The action may be at least one of: spray a chemical; apply a weed wipe; collect a sample.

The device may be configured to receive instructions for the action from a further entity.

The device may further comprise a module for receiving an identification of an area for the device to be deployed in, and for determining a route along a path between waypoints for the device to move within the area.

A system may comprise the further entity and the device, wherein the further entity is configured to receive satellite data and control the device in dependence on the satellite data, and receive sensed data from the device and enhance the satellite data with the sensed data from the device.

A system may comprise the further entity or the device, wherein the further entity is configured to receive earth observation data and control the device in dependence on the earth observation data, and receive sensed data from the device and enhance the earth observation data with the sensed data from the device.

A system comprising the further entity and the device, and further comprise at least one interface device, the entity comprising a module for receiving an identification of an area for the device to be deployed in, and for determining a route along a path between waypoints for the device to move within the area, the path including at least one waypoint at which a module is located.

In any described system, there may be provided the ability to tell tractors where to go.

The device may be provided with a battery, and the module comprises an interface for providing a replacement battery.

The module may comprise an interface for removing or adding a sensing or action module to the device.

There is provided a method for utilising a device for monitoring and/or engaging to action comprising: moving the device between locations; enabling monitoring and/or engaging to action when the device is stationary at a location.

When providing monitoring, the method may further comprise deploying a sensing means at each location to sense data at the location. The sensing means may be a camera. The data may be images of the location.

The method may further comprise transmitting sensed data from the device to a further entity.

The method, when providing engagement for action, may further comprise carrying out an action at each location. The action may be at least one of: spray a chemical; apply a weed wipe; collect a sample.

The method may further comprise receiving at the device instructions for the action from a further entity.

The method may further comprise receiving an identification of an area for the device to be deployed in, and determining a route along a path between waypoints for the device to move within the area.

A method for a system may comprise the further entity, and further comprise receiving satellite data at the entity and controlling the device in dependence on the satellite data, and receiving sensed data at the device and enhancing the satellite data with the sensed data from the device.

A method for a system may comprise the further entity and further comprise receiving earth observation data at the entity and controlling the device in dependence on the earth observation data, and receiving sensed data at the device and enhancing the earth observation data with the sensed data from the device.

A method for a system may comprise the further entity of, wherein the entity further comprises at least one module for receiving an identification of an area for the device to be deployed in, and determines a route along a path between waypoints for the device to move within the area, the path including at least one waypoint at which a module is located.

The method may further comprise providing the device with a battery, and providing the module with an interface for providing a replacement battery.

The method may further provide the module with an interface for removing or adding a sensing or action module to the device.

There is provided a device comprising: a flight mechanism for flying the device to a location; and a landing mechanism for landing the device at the location, wherein the flight mechanism is configured to terminate on a landing phase, the landing mechanism being configured to land the device without any assistance from the flight mechanism.

The flight mechanism may be a powered mechanism, and the power is terminated on landing.

The landing mechanism may be a mechanical mechanism which is not powered.

The landing mechanism may comprise a plurality of legs adapted to absorb the force of landing, wherein landing comprises disengaging the flight mechanism and dropping the device to the ground. The plurality of legs may form a cage for landing.

More additional legs may be provided than are needed for standing of the device.

The landing mechanism may include a leg which is orientated in the direction of flight during the flight, such that on landing the leg engages with the ground to prevent motion in the direction of flight.

The device may further comprise a mechanism for self-righting the device on landing. The self-righting mechanism may be provided by one or more legs being of an adjustable length. The self-righting mechanism may be provided by one or more legs being fixed to a rotatable part of the device housing.

The device may further comprise a module for determining the location of the device on landing, and comparing it to the intended location on landing, and for adjusting the landing position of the device based on that comparison. The device may be provided with a jumping mechanism, which is actuated in order to adjust the position of the device.

There is provided a method for controlling movement of a device, comprising: in a flight phase flying the device toward a second location; and in a landing phase landing the device at a second location after the flight phase, wherein the flight mechanism is configured to terminate on a landing phase, the landing mechanism being configured to land the device without any assistance from the flight mechanism.

The flight mechanism may comprise providing a powered mechanism, wherein the powered mechanism is turned off on landing.

The landing mechanism may comprise providing a mechanical mechanism, wherein the mechanical mechanism is not powered.

Providing the landing mechanism may comprise providing a plurality of legs adapted to absorb the force of landing, wherein landing comprises disengaging the flight mechanism and dropping the device to the ground. The plurality of legs may be provided as a cage for landing.

Additional legs than are needed for standing of the device may be provided.

The method may further provide as part of the landing mechanism a leg which is orientated in the direction of flight during the flight, such that on landing the leg is provided to engage with the ground to prevent motion in the direction of flight.

The method may further provide a mechanism for self-righting the device on landing. The method may further provide the self-righting mechanism as one or more legs being of an adjustable length.

The method may further comprise providing the self-righting mechanism by one or more legs being fixed to a rotatable part of the device housing.

The method may further comprise determining the location of the device on landing, and comparing it to the intended location on landing, and adjusting the landing position of the device based on that comparison. The method may further comprise actuating a jumping mechanism to adjust the position of the device.

There is disclosed a launch mechanism for a device comprising: an actuatable element for launching the device from a first location on the ground into the air.

The launch mechanism may comprise a resilient element which is disposed against the ground at the first location, in order to provide a take-off force for launch.

The resilience of the resilient element may be adjustable.

The launch mechanism may comprise a damper element for distributing the take-off force associated with the resilient element over time.

The actuatable element may be movable between a first position in which it is retracted toward a housing of the device, and a second position in which it is positioned for launch of the device. In the second position the actuatable element may extend between a first end connected to the housing, and a second end contacting the ground. In the first position the second end does not contact the ground.

The device may further comprise a rotatable housing to which the actuatable element is fixed, wherein the actuatable element is rotated by rotating the housing. The actuatable element may be disposed such that it contacts the ground at a location which is away from the direction of launch.

The actuatable element may be provided with a non-slip means at one end thereof.

The may further comprise a plurality of legs, which support the device when positioned on the ground, wherein the actuatable element is positioned in order to provide the take-off force for launch whilst the device is supported on the ground by one or more of the plurality of legs.

The actuatable element may be a leg.

There is disclosed a method for launching a device, comprising: controlling an actuatable element at a first location on the ground at which the device is positioned, to launch the device into the air.

The launch phase may utilise a resilient element as the actuatable element, and the method comprises disposing the actuatable element against the ground at the first location, in order to provide a take-off force for launch.

The resilience of the resilient element is adjustable.

The method may further comprise providing a damping force for distributing the take-off force associated with the resilient element over time.

The method may further comprise moving the actuatable element between a first position in which it is retracted toward a housing of the device, and a second position in which it is positioned for launch of the device. In the second position the actuatable element may extend between a first end connected to the housing, and a second end contacting the ground. In the first position the second end may not contact the ground.

The method may further comprise rotating the actuatable element around a housing of the device.

The method may further comprise disposing the actuatable element such that it contacts the ground at a location which is away from the direction of launch.

The method may further comprise providing the actuatable element with a non-slip means at one end thereof.

The method may further comprise providing the device with a plurality of legs, which support the device when positioned on the ground, wherein the actuatable element is positioned in order to provide the take-off force for launch whilst the device is supported on the ground by one or more of the plurality of legs.

The actuatable element may be a leg.

There is disclosed a device comprising: a launch mechanism, comprising an actuatable element for launching the device from a first location on the ground into the air; a flight mechanism for flying the device in the air after launch toward a second location; and a landing mechanism for landing the device at a second location after the flight.

The launch mechanism may comprise a resilient element which is disposed against the ground at the first location, in order to provide a take-off force for launch. The resilience of the resilient element may be adjustable. The launch mechanism may comprise a damper element for distributing the take-off force associated with the resilient element over time.

The actuatable element may be movable between a first position in which it is retracted toward a housing of the device, and a second position in which it is positioned for launch of the device. In the second position the actuatable element may extend between a first end connected to the housing, and a second end contacting the ground. In the first position the second end may not contact the ground.

The device may further comprise a rotatable housing to which the actuatable element is fixed, wherein the actuatable element is rotated by rotating the housing. The actuatable element may be disposed such that it contacts the ground at a location which is away from the direction of launch.

The actuatable element may be provided with a non-slip means at one end thereof.

The device may further comprise a plurality of legs, which support the device when positioned on the ground, wherein the actuatable element is positioned in order to provide the take-off force for launch whilst the device is supported on the ground by one or more of the plurality of legs.

The actuatable element may be a leg.

The flight mechanism may comprise one or more propellers. The flight mechanism may be engaged after launch. The device flight mechanism may be disengaged prior to landing.

The landing mechanism may comprise a plurality of legs adapted to absorb the force of landing, wherein landing comprises disengaging the flight mechanism and dropping the device to the ground.

There is described a method for controlling movement of a device, comprising: in a launch phase, controlling an actuatable element at a first location on the ground at which the device is positioned, to launch the device into the air; in a flight phase, after the launch phase, flying the device toward a second location; and in a landing phase, landing the device at a second location after the flight phase.

The launch phase may utilise a resilient element as the actuatable element, and the method comprises disposing the actuatable element against the ground at the first location, in order to provide a take-off force for launch. The resilience of the resilient element may be adjustable.

The method may further comprise providing a damping force for distributing the take-off force associated with the resilient element over time.

The method may further comprise moving the actuatable element between a first position in which it is retracted toward a housing of the device, and a second position in which it is positioned for launch of the device.

In the second position the actuatable element may extend between a first end connected to the housing, and a second end contacting the ground. In the first position the second end may not contact the ground.

The method may further comprise rotating the actuatable element around a housing of the device.

The method may further comprise disposing the actuatable element such that it contacts the ground at a location which is away from the direction of launch.

The method may further comprise providing the actuatable element with a non-slip means at one end thereof.

The method may further comprise providing the device with a plurality of legs, which support the device when positioned on the ground, wherein the actuatable element is positioned in order to provide the take-off force for launch whilst the device is supported on the ground by one or more of the plurality of legs.

The actuatable element may be a leg. The flight mechanism may comprise one or more propellers. The method may comprise engaging the flight mechanism after launch. The method may further comprise disengaging the flight mechanisms prior to landing.

The method may further comprise providing a mechanism to absorb the force of landing, wherein landing comprises disengaging the flight mechanism and dropping the device to the ground.

The invention is described by way of example with reference to the accompanying drawings, in which:

FIGS. 1(a) to 1(d) illustrate an exemplary device;

FIG. 2 illustrates exemplary control circuitry for the device of FIGS. 1(a) to 1(d);

FIGS. 3(a) to 3(b) illustrate an operation of the exemplary device;

FIGS. 4(a) to 4(b) illustrate an alternative exemplary device;

FIGS. 5(a) to 5(e) illustrate a further alternative exemplary device;

FIGS. 6(a) to 6(c) illustrate an operation of the exemplary device;

Figure 13:
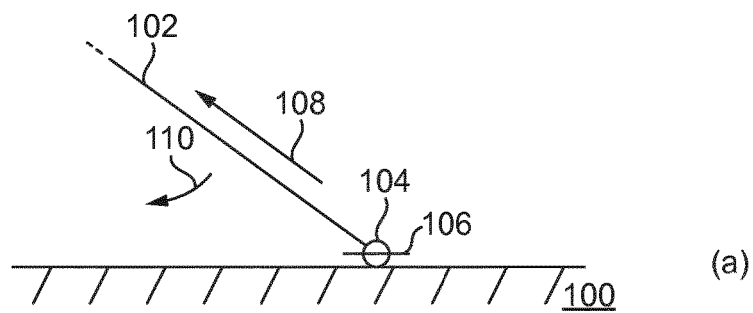
Figure 13:
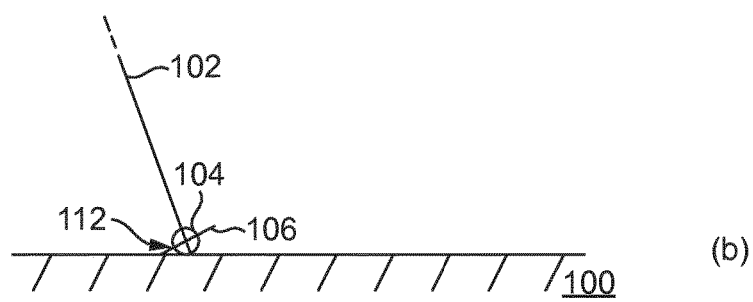
Figure 14:
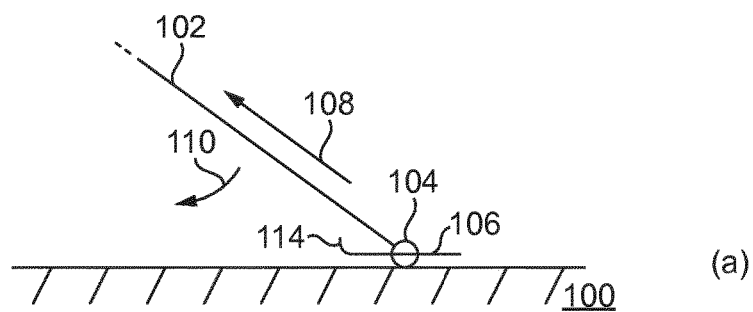
Figure 14:
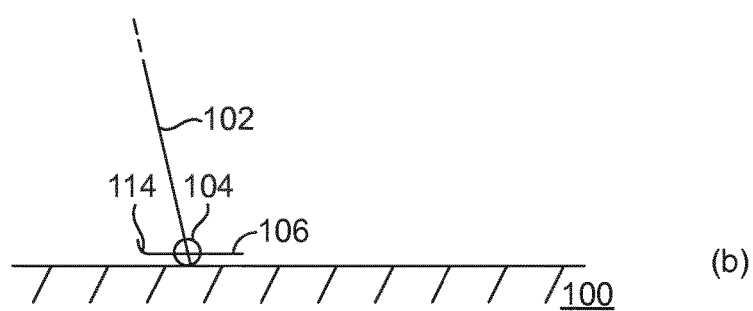
Figure 15:
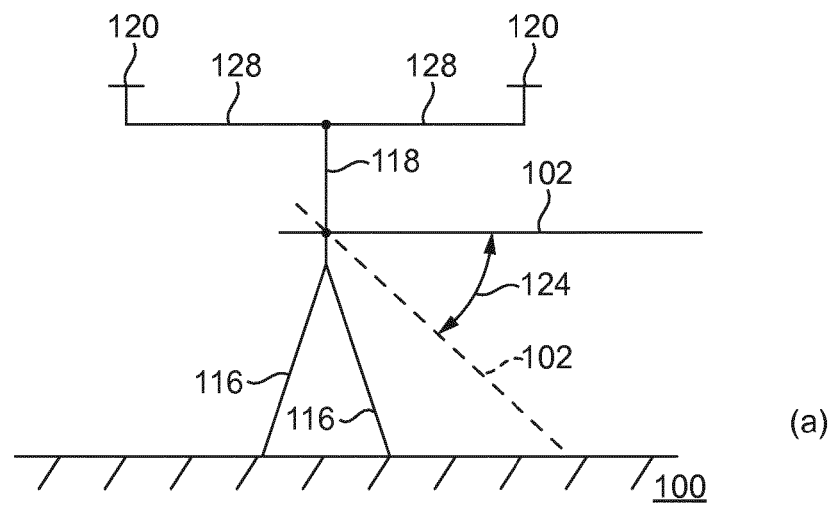
Figure 15:
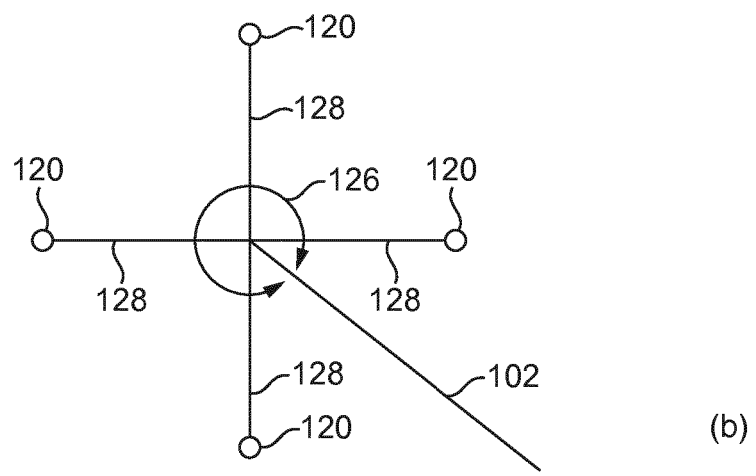
Figure 16:
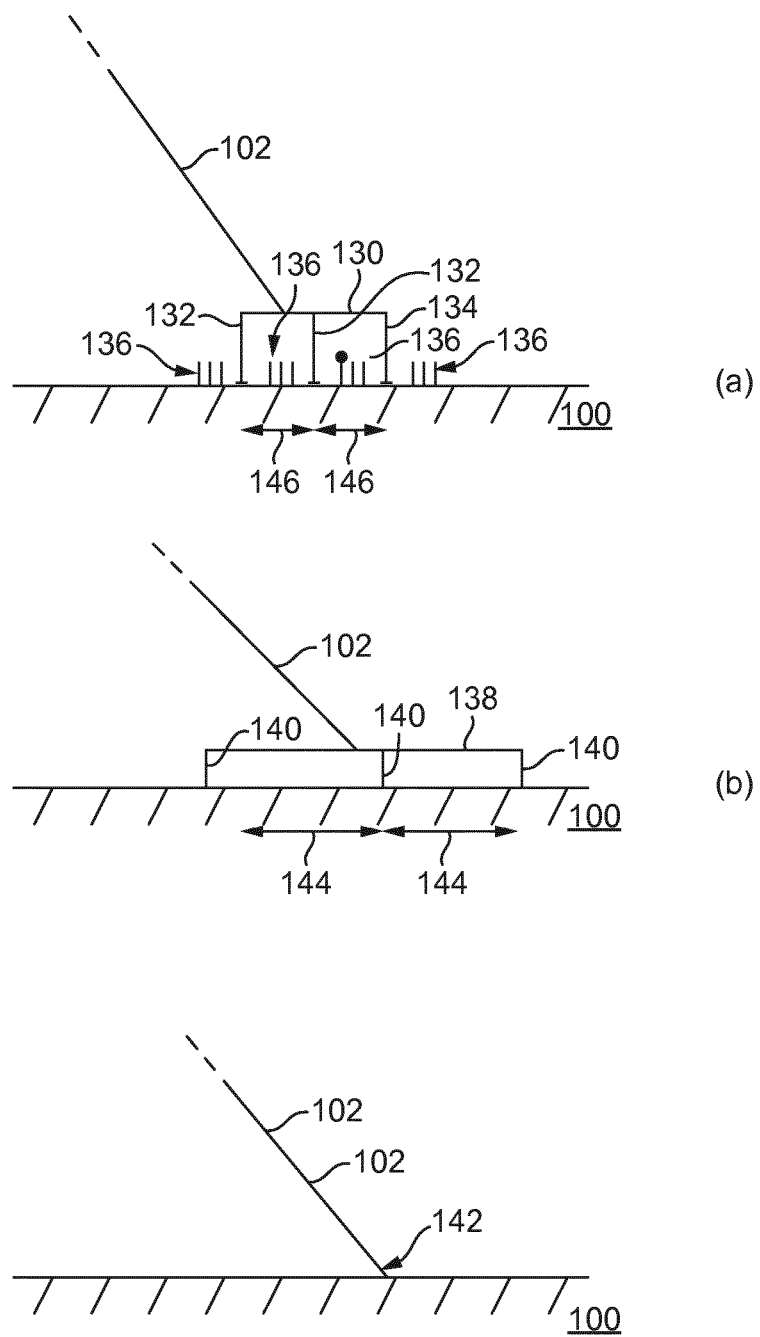
Figure 17:
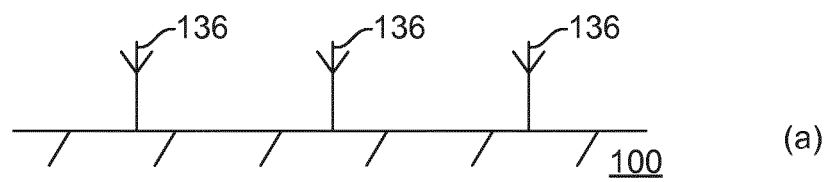
Figure 17:
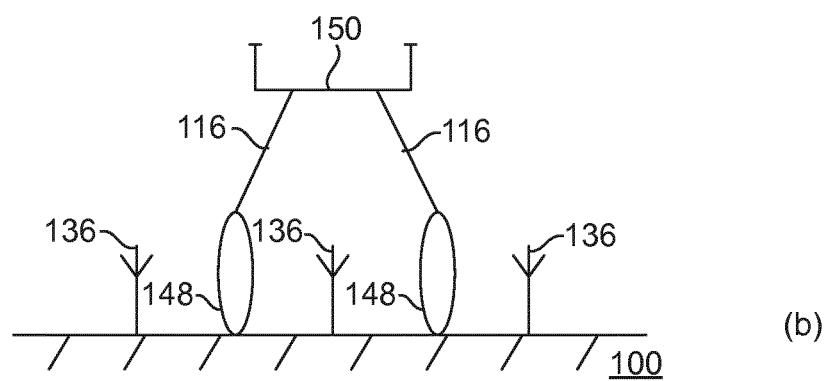
Figure 17:
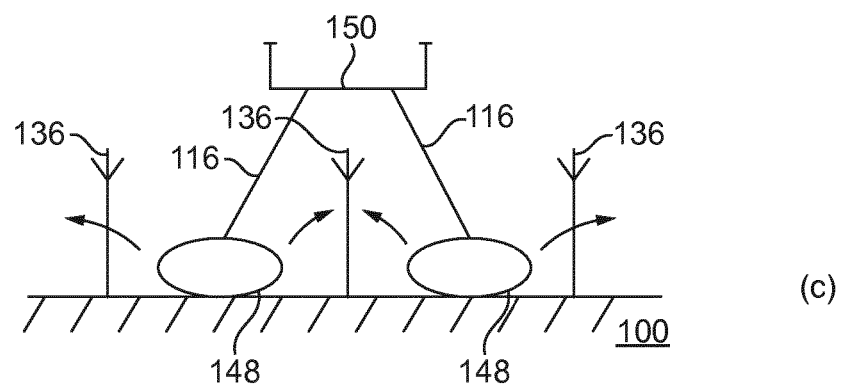

FIGS. 13(a) and 13(b) illustrate a first exemplary launch arm incorporating a winding mechanism;

FIGS. 14(a) and 14(b) illustrate a second exemplary launch arm incorporating a winding mechanism;

FIGS. 15(a) and 15(b) illustrate an exemplary implementation of a launch arm;

FIGS. 16(a) to 16(c) illustrate exemplary illustrations of foot layouts for a launch arm;

FIGS. 17(a) to 17(c) illustrate an exemplary expanding foot; and

Figure 18:
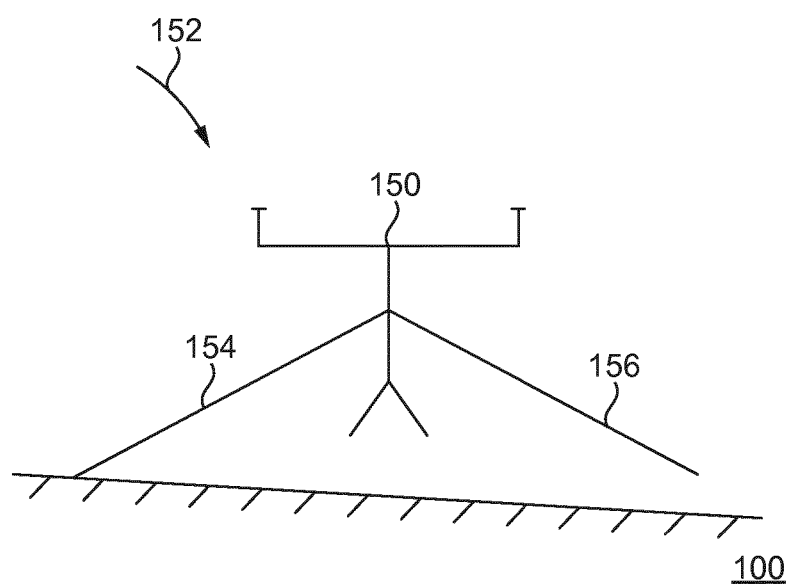

FIG. 18 illustrates an exemplary arresting leg for landing.

There is now described various examples and arrangements.

There is described: a device; launch, flight, and landing of a device; control of a device, and implementations of a device.

In the following, the device is described with reference to the inclusion of particular apparatus and the performance of particular functions. The device is not limited to including all such apparatus, nor being able to perform all such functionality. The device may include some or all of the described apparatus, and perform some or all of the described functions. Some or all means one or more.

In the following, the device is described with reference to a particular implementation, of monitoring a field for weeds, and deploying treatment to remove the weeds. The monitoring for weeds is an example of an inspection (or investigation) performed by the device, and the removal of the weeds is an example of an action performed by the device responsive to this inspection.

The described device, and the described system associated with the described device, can be used in other implementations, and is not limited to weed inspection and/or removal.

In embodiments the device may be utilised for inspection interfacing with a system, such as a system which utilises space data, or more particularly earth observation (EO) data. Scanning (or inspection) performed by the device may preferably be combined with space data, to enhance the space data.

In embodiments the device may be used for action with a system, such as a system which utilises space data, which system provides imaging information for controlling the device. The device may implement such action without itself carrying out inspection or scanning, and simply utilising space scanning. The device may additionally implement its own scanning/inspection to enhance the space data.

An example implementation of a device is illustrated in FIGS. 1(a) to 1(d). It will be understood that this device is exemplary, and the specific construction of this example device is not essential, nor are elements of this example device essential.

With reference to FIGS. 1(a) to 1(d), the example device 1 comprises: a housing or main body 2; a stalk 4 or leg; a set of three tripod legs 6a to 6c; a set of four solar panels 16a to 16d; a set of four panel arms 17a to 17d; a set of four propellers 18a to 18c; a set or four motor arms 19a to 19d; a rotatable camera mount 8, a camera 10, a rotatable spray arm pair 12, 14; and a nozzle assembly 22.

The device may be referred to as a robot, a drone or a hopper.

The housing or main body 2 comprises the electronics necessary for the operation of the device 1. An exemplary schematic of the control circuitry of such electronics is shown in FIG. 2.

Figure 1A:
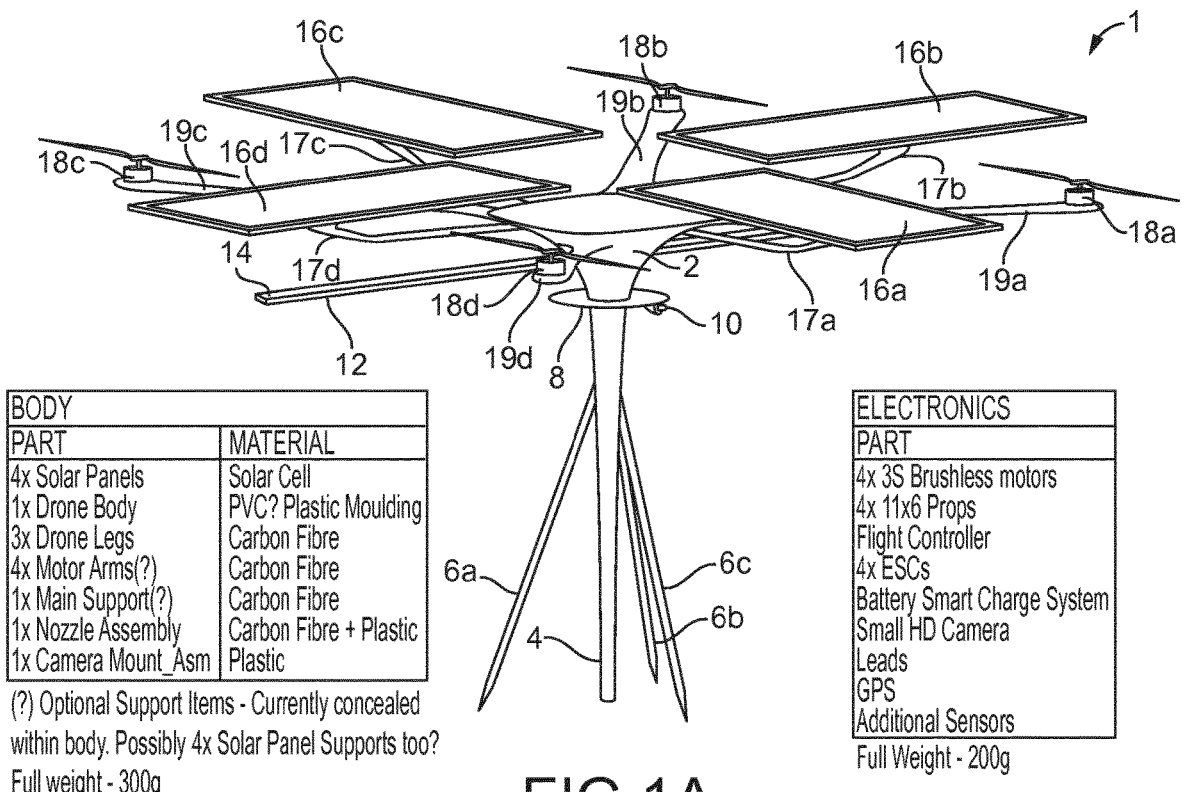
Figure 1B:
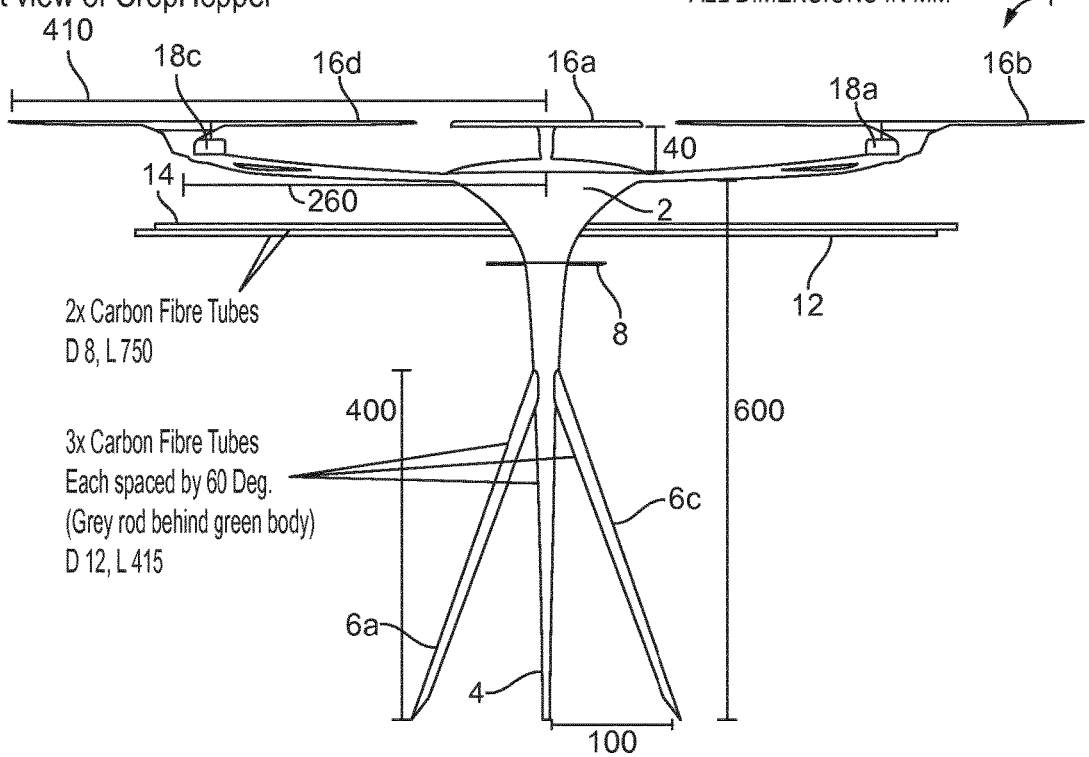
Figure 1C:
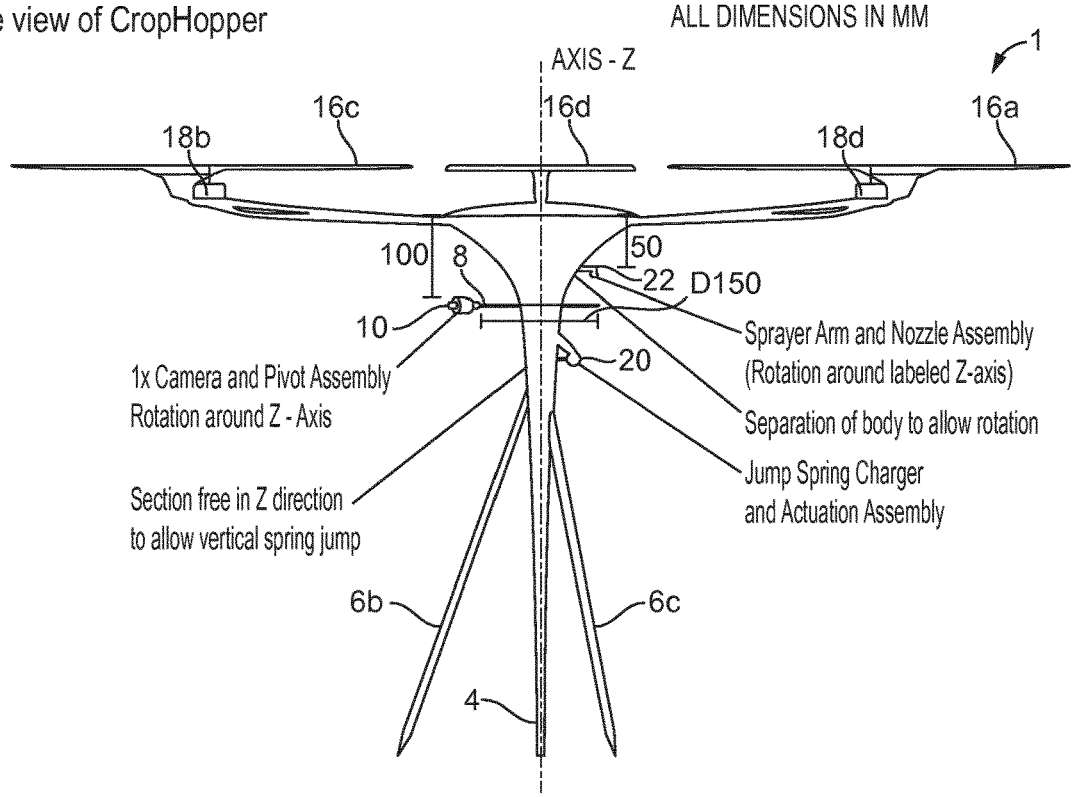
Figure 1D:
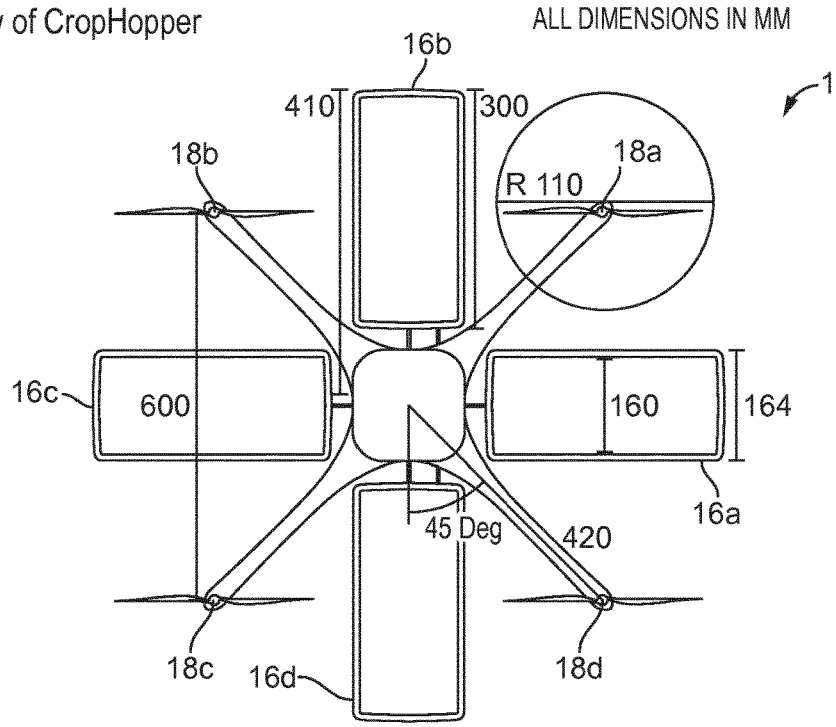
Figure 2:
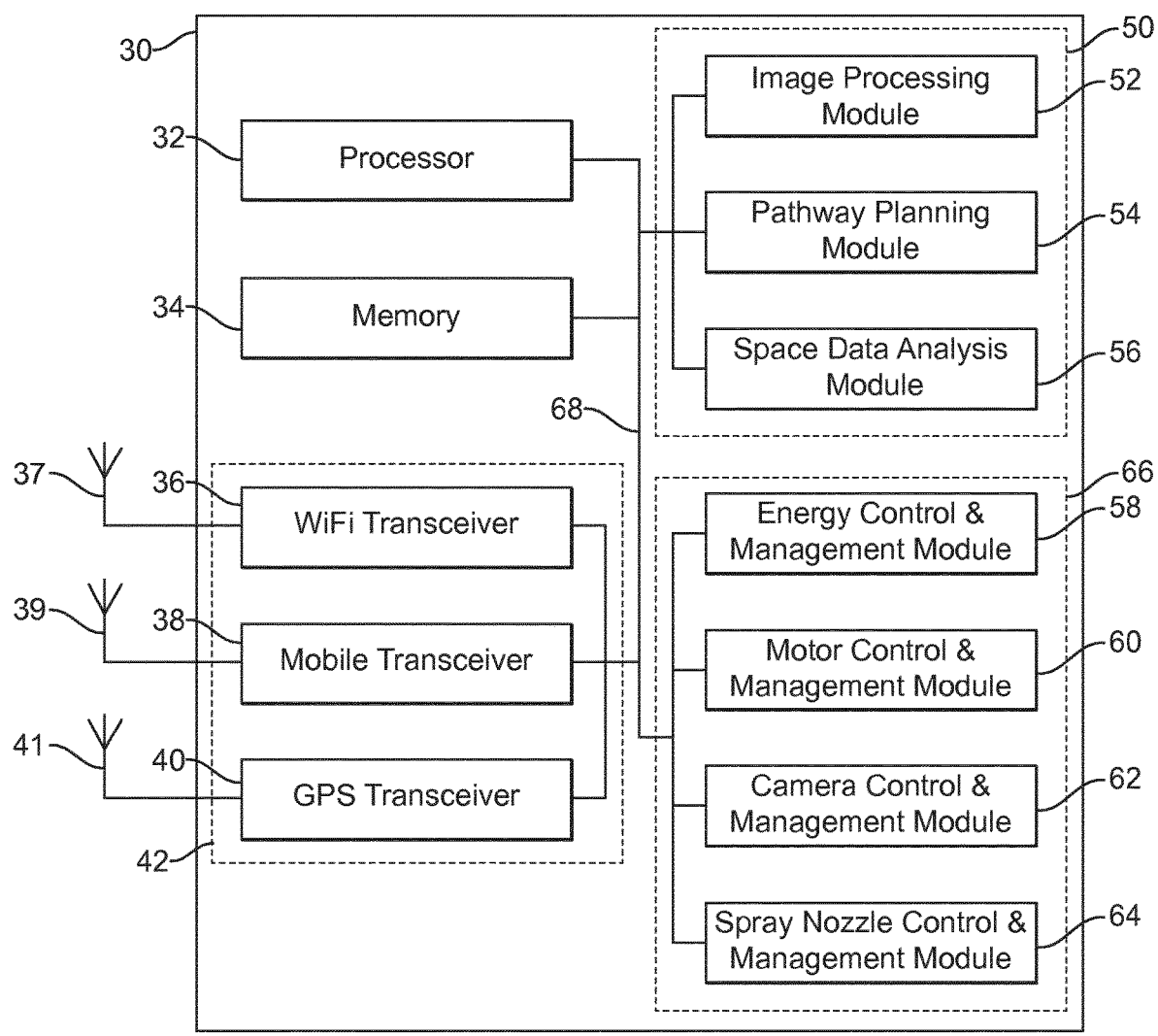

Referring to FIG. 2, the control circuitry is generally designated by reference numeral 30, and comprises: a processor 32; a memory 34; a set of transceivers 42, including a WiFi transceiver 36, a mobile transceiver 38, and a GPS transceiver 40 each linked to a respective antenna 37, 39, 41; a set of modules 50 for performing specific processing, including an image processing module 52, a pathway planning module 54, and a space data analysis module 56; and a set of modules 66 for controlling functionality of the device, including an energy control and management module 58, a motor control and management module 60, a camera control and management module 62, and a spray nozzle control and management module 64. All the elements of the control circuitry 30 are interconnected by communication lines 68.

In general the housing or main body 2 is preferably provided with means to enable it to: (i) be stably positioned on the ground; (ii) allow any peripheral devices associated with the device, such as a camera or a spray arm, to be suitably deployed when stably positioned on the ground; and (iii) move between stable locations.

In the embodiment illustrated in FIGS. 1(a) to 1(d), the exemplary housing or main body 2 is provided with the stalk 4 and the three legs 6a, 6b, 6c comprising a tripod stand around the stalk.

In this embodiment, the stalk 4 is attached directly underneath the housing or main body 2, and may be formed integral to the housing or main body 2. The stalk 4 extends in a stable position, with the device 2 on the ground, from the housing or main body portion 2 to the ground, and may extend partially into the ground surface to provide an 'anchor'. The stalk 4 may be designed to support the majority of the weight of the housing or main body 2. The stalk 4 may thus provide a primary 'leg' for the device when the device is stationary and positioned on the ground.

A stalk is illustrated in this embodiment, but is not essential. Other embodiments, as shown in later figures, do not utilise a stalk.

Where provided, a single leg such as stalk 4 provides a sufficiently stable base for the housing or main body 2 when it is positioned on the ground, provided the stalk extends into the ground sufficiently to provide a stable anchor. However a characteristic of the device—as discussed below—is that it can launch or take-off or jump from one stationary location to another stationary location. As such, a firm anchor point for the stalk may be undesirable, as this will inhibit the take-off or jumping action, or at least require additional energy to be associated with the take-off or jumping action.

The three tripod legs 6a to 6c are provided to allow stable positioning without requiring the stalk 4 to significantly extend into the ground (and in embodiments, may be provided without the stalk). The three tripod legs 6a to 6c may attach at one end to the stalk 4, and at the other end be positioned on the ground to stably position the housing. This is shown in FIGS. 1(a) to 1(d).

The tripod legs 6(a) to 6(d) may be of an adjustable length, and may extend from the stalk at adjustable angles, to enable them to provide stability to the physical support of the stalk on the ground. The adjustability (length and angle) of the tripod legs enables them to provide this stability on uneven ground. Thus the tripod legs may be telescopic, and may extend to orientate the device 1 in an operational orientation.

Figure 3A:
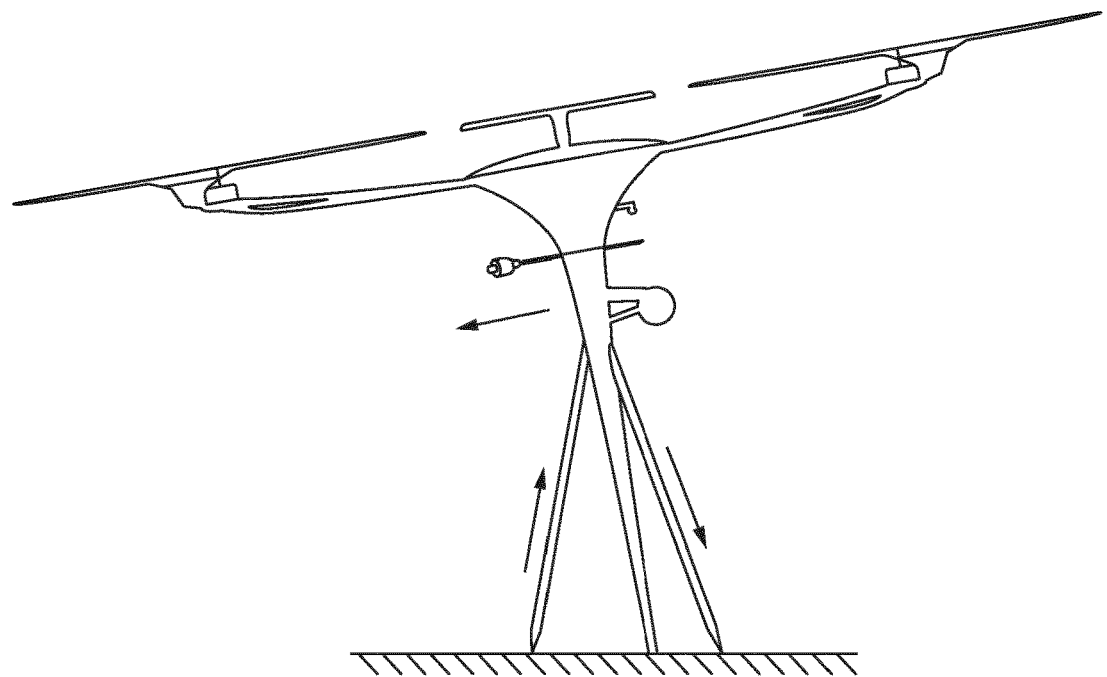
Figure 3B:
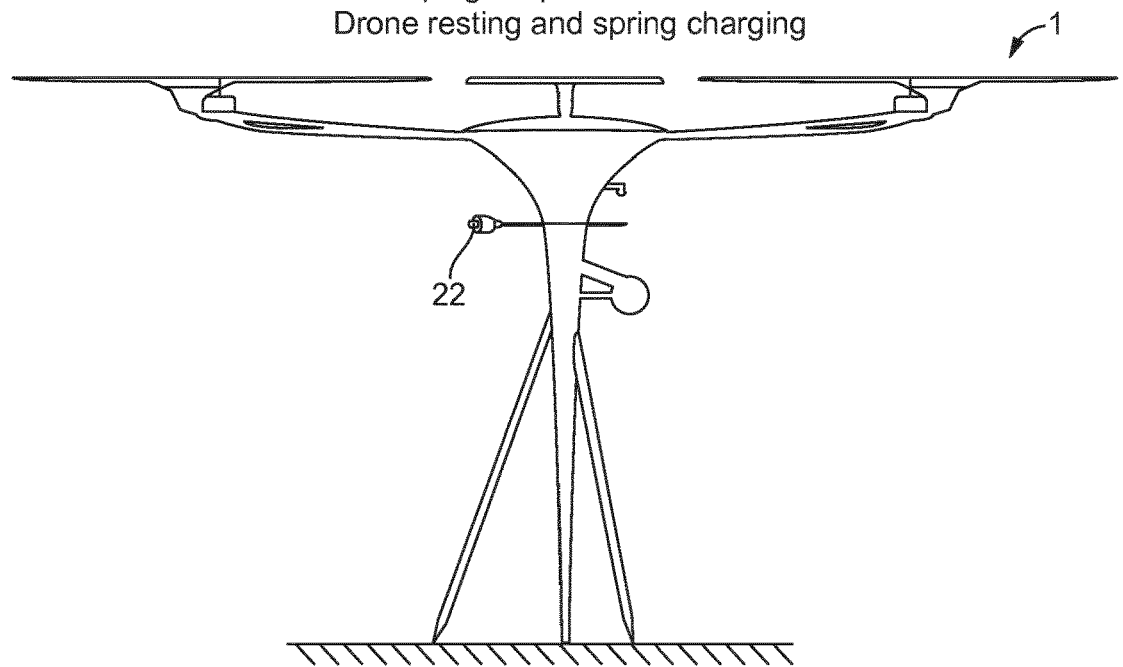

This is illustrated in FIGS. 3(a) and 3(b). As shown in FIG. 3(a), the device 1 lands on the ground, and the plane of the propellers is not parallel with the ground. The legs 6a to 6c are adjusted, for example by adjusting the telescopic extension, in order to arrive at a position where the plane of the propellers is substantially parallel to the ground as shown in FIG. 3(b). With the plane of the propellers substantially parallel to the ground, the peripherals of the device 2, such as the camera and spray arm, can be optimally operated.

Motors may be provided to telescopically adjust the length of the tripod legs. The legs may be adjusted telescopically by a motor, or the telescopic operation may not be actuated by a motor.

The tripod legs 6a to 6c may be controlled by the control circuitry 30 of the device 1 such that they are retracted to be flush with the stalk when the device moves (i.e. they are pulled in), and such that they are deployed to provide stability when the device is stationary. They may be deployed prior to a stationary position being finalised in order to stabilise the device 1. As will be discussed below, the tripod legs 6a to 6c may be controlled in order to assist in the take-off or hopping operation of the device 1.

The motor control and management module 60 may control the extension of each of the legs 6a to 6c individually, and may control the angle of extension of each of the legs 6a to 6c individually.

It will be understood that the implementation of the device 1 with the stalk 4 and/or the tripod legs 6a to 6c is exemplary, and other means may be provided to meet the objectives of providing stability on the ground, coupled with ready take-off and landing of the device 1.

Figure 4A:
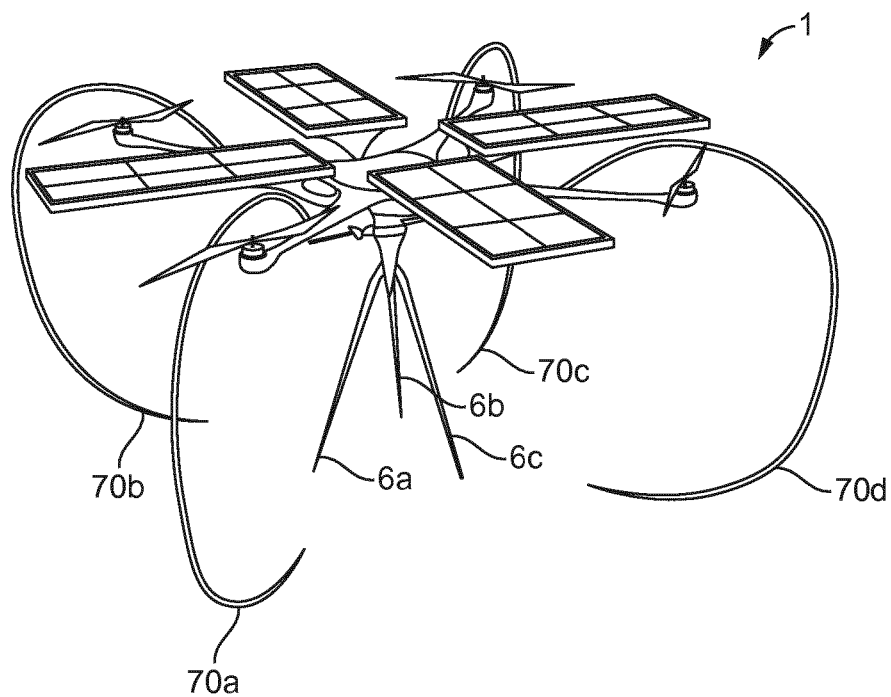
Figure 4B:
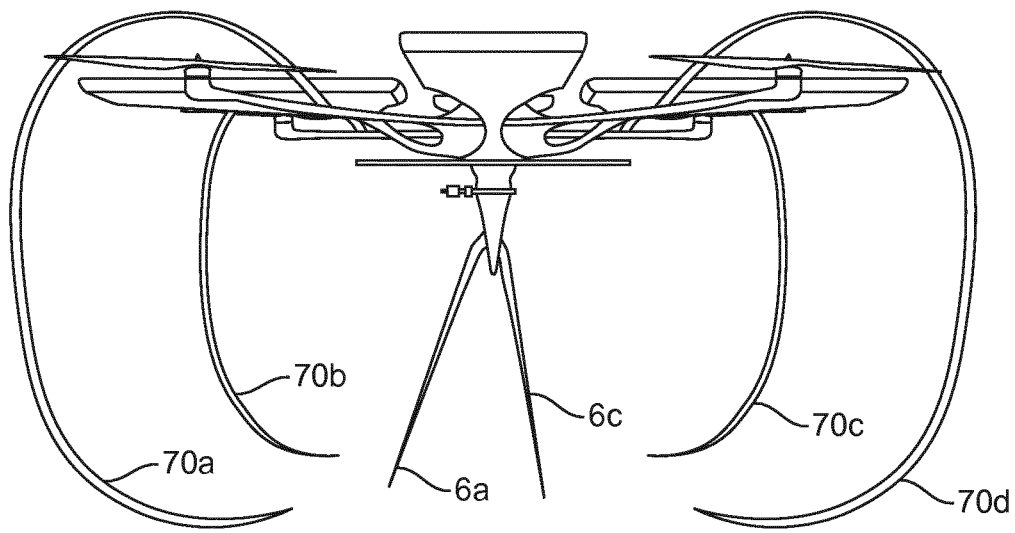

An alternative is shown FIGS. 4(a) and 4(b). In this alternative the tripod legs 6a to 6c are still provided, but the stalk 4 is eliminated. In addition there is provided four flexible legs 70a to 70d, approximately positioned at 90° to each other, to provide stability to the device 1, and to prevent the device 1 from falling over when it lands on the ground, or as it is being positioned.

A further modification to the arrangement of FIGS. 4(a) to 4(d) can be envisaged, where only the flexible legs 70a to 70d are provided, and less or more than four flexible legs may be provided.

A further alternative arrangement utilising four legs but without a stalk is shown in FIGS. 5(a) to 5(e). In this device four legs 6a, 6b, 6c, 6d are provided to be used with a jump leg 29 attached to the upper body. All four legs are not visible in the various views of the figures.

The legs may be provided with a platform-type arrangements at the end with which they contact the ground, to prevent them sinking into the soil. It will be generally understood that a device may be provided with a leg arrangement which is suitable for meeting the described criteria, namely for the device to: (i) be stably positioned on the ground; (ii) allow any peripheral devices associated with the device, such as a camera or a spray arm, to be suitably deployed when stably positioned on the ground; and (iii) move between stable locations.

The exemplary device 1 of FIGS. 1(a) to 1(d) is provided with a jump spring charger and actuation assembly generally denoted by reference numeral 20. The purpose of this mechanism is to provide additional lift to the device 1 for take-off or hopping. This mechanism can thus cooperate with the use of the propellers to assist in the take-off or hopping of the device.

In an alternative, the device may be provided with compressed gas or CO2 canisters to assist in the take-off or hop launch. This may be instead of or in addition to the spring loaded jumping mechanism, with or without propeller assistance, and with the propellers then used to control the movement of the device 1 once airborne.

Figure 5A:
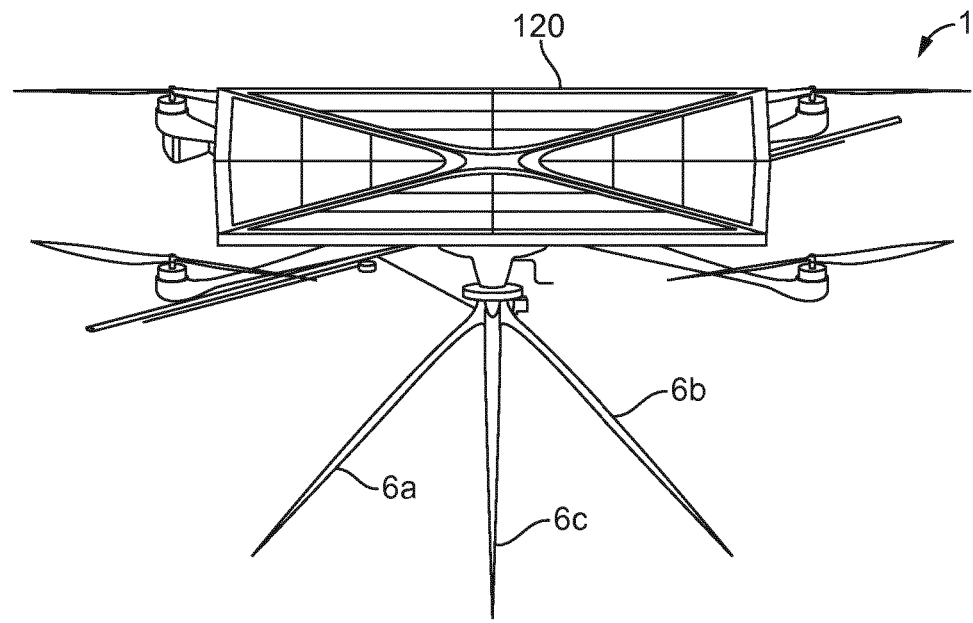
Figure 5B:
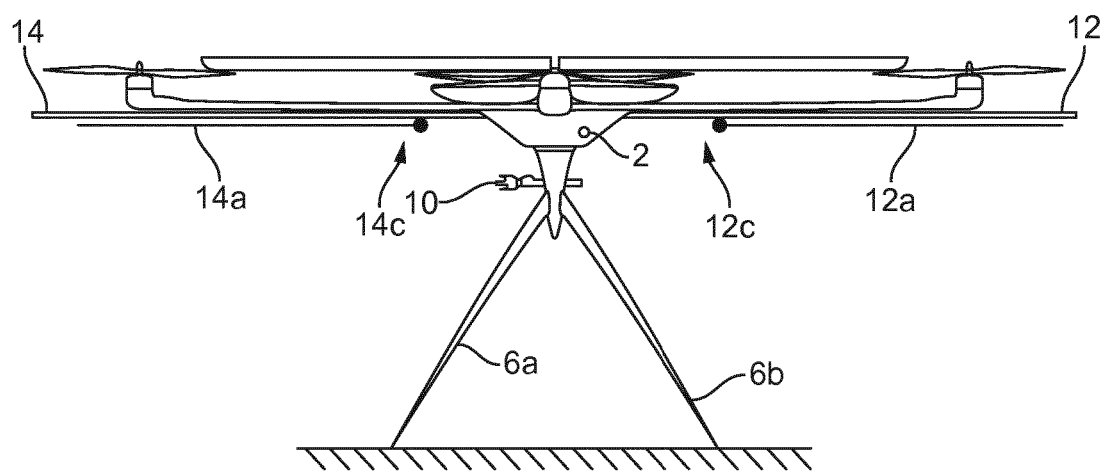
Figure 5C:
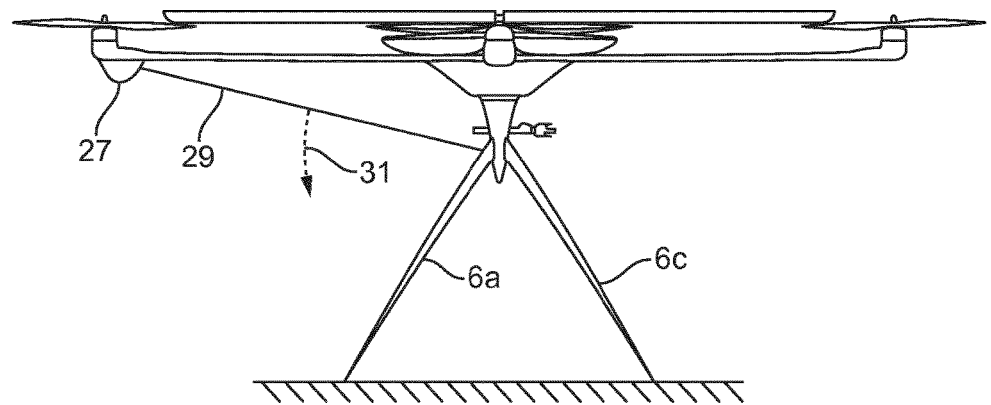

The device of FIGS. 5(a) to 5(e) is provided with a further alternative arrangement. As shown in FIG. 5(c), the device is provided with an additional leg 29, which in FIG. 5(c) is connected from the housing 2 to a connection point 27, with the connection point 27 being provided, for example, at the distal end (radial end) of one of the rotor arms.

The leg 29 can be deployed by releasing it from the connection point 27, and deploying it towards the ground so that one end of the leg is connected to the housing 2, and the other end of the leg makes contact with the ground. The movement of the leg 29 can be controlled by a motor, and the connection point 27 can be electrically controlled to secure/release the leg.

The leg 29 is used to assist in take-off of the device, and may be used to give an additional thrust for take-off. This may be achieved, for example, by deploying the leg 29 so its end engages with the ground and creates a resilient or spring type engagement, which is then used in the take-off operation to assist in take-off.

The leg 29 is deployed such that it is trailing to the take-off direction, to assist in launching the device in the direction of take-off. The housing 2 therefore may be rotatable, or there may be provided a portion of the housing, possibly below the housing, so that as the device lands, the leg 29 can be rotated so that it is in the correct orientation for deployment.

The leg is preferably not used for stability, and purely provides assistance for the take-off operation. Stability legs are therefore preferably provided additional to this leg 29.

If the stability legs, such as legs 6a to 6c, are motor controlled, then once the leg 29 is deployed for take-off, one or two of the stability legs 6a to 6c can be withdrawn (telescopically) prior to the take-off operation.

The device may be provided with a resilient means to assist in take-off, the resilience of which is adjustable, preferably dynamically adjustable under the control of the control circuitry 30. The resilience may be dynamically adjustable such that control circuitry can take into account, for example, wind speed and wind direction, as well as the distance of the location to which the device is to be moved.

The resilient means may for example be a wound spring, which is controlled differently by the control circuitry 30 to provide different strength jumps.

The resilient means is preferably a leg such as leg 29 in FIGS. 5(a) to 5(e).

The distal end of the leg which engages with the ground on deployment may be provided with a self-righting mechanism. This mechanism may be a self-righting foot mechanism such as a wheel or a skid. If the leg is a jumping leg which may be wound, as it is wound the self-righting mechanism ensures the foot maintains the correct contact orientation with the soil.

With reference to FIGS. 13(a) and 13(b) there is illustrated a first exemplary arrangement of a leg comprising a winding mechanism.

A leg 108 extends at an angle from a device (not shown) towards the ground 100. The end of the leg 102 in contact with the ground is provided with a wheel 104 and a planar portion 106 for engagement with the ground. As shown in FIG. 13(a), initially the planar portion 106 is not engaged with the ground 100.

A winding mechanism employed in the device causes the leg to contract, or move in the direction of the arrow 108, such that in order to maintain the contact with the ground the leg also moves in the direction of the arrow 110. The leg moves along the ground (facilitated by the wheel 104), then reaches a point at which the planar portion 106 engages with the ground 100, to secure the leg, and hence the device to which it is attached. This is shown in FIG. 13(b). Reference numeral 112 denotes the engagement of the planar element 106 with the ground 100.

With reference to FIGS. 14(a) and 14(b) there is illustrated a second exemplary arrangement of a leg comprising a winding mechanism.

A leg 108 extends at an angle from a device (not shown) towards the ground 100. The end of the leg 102 in contact with the ground is provided with a wheel 104 and a planar portion 106 for engagement with the ground. As shown in FIG. 13(a), initially the planar portion 106 is not engaged with the ground 100. The planar portion extends to include a 'skid' portion 114.

A winding mechanism employed in the device causes the leg to contract, or move in the direction of the arrow 108, such that in order to maintain the contact with the ground the leg also moves in the direction of the arrow 110. The leg moves along the ground (facilitated by the wheel 104), then reaches a point at which the skid portion 114 of the planar portion 106 engages with the ground 100, to secure the leg, and hence the device to which it is attached. This is shown in FIG. 13(b). The use of the skid portion may facilitate launching after landing better than the arrangement of FIGS. 13(a) and 13(b).

With reference to FIGS. 15(a) and 15(b) there is illustrated an exemplary arrangement of control of a leg to facilitate actuation of the leg, the leg being a launch or jumping leg.

The leg 102 is shown attached to a body 18 of a device, and two rotor arms 128 extending to two respective rotors 120 is shown. The device is associated with legs 116 which extend to the ground 100, to allow the device 118 to be positioned on the ground.

The leg 102 is a launch leg, and may extend from a position in which it is generally horizontal to the ground to a position in which it engages with the ground, as denoted by arrow 124 of FIG. 15(a).

In addition, as shown by the plan view of FIG. 15(b), the arm 102 can rotate around the device 118, through 3600, so it can be deployed at any rotation bearing to assist in take-off toward a particular direction.

With reference to FIGS. 16(a) to 16(c) there is illustrated exemplary foot layouts for a leg.

As shown in FIG. 16(a), the leg 102 is provided with an arrangement at the end with which it engages with the ground, to avoid crop damage. As shown a plurality of crops 136 are present in the ground. The leg 102 has a foot comprising of a section 130 parallel to the ground (which may be hingeably connected to the leg 102), and having a plurality of prongs 132 which extend from section 130 substantially perpendicular to the ground surface, such that the foot extensions 132 are positioned to engage the ground in locations between the crops. The prongs are separated by a distance denoted by reference numeral 146, which is a distance determined by the crop layout/distribution. Damage to the crops is avoided. The number of prongs may vary.

As shown in FIG. 16(b), the leg 102 is provided with an arrangement at the end with which it engages with the ground, where the ground surface may be easily penetrable, for example being light soil. The leg 102 has a foot comprising of a section 138 parallel to the ground (which may be hingeably connected to the leg 102), and having a plurality of prongs 140 which extend from section 138 substantially perpendicular to the ground surface, such that the foot extensions 140 are positioned to engage the ground in to spread the weight of the device. The prongs are separated by a distance denoted by reference numeral 144, which is a distance determined as optimal for spreading the weight of the device. The number of prongs may vary. Damage to the crops is avoided.

As shown in FIG. 16(c), the leg 102 may be provided with an arrangement at the end with which it engages with the ground which is a high friction foot, to ensure robust engagement with the ground 100.

With reference to FIGS. 17(a) to 17(c) there is illustrated an exemplary arrangement for a leg, to provide an alternative arrangement for avoiding crop damage.

FIG. 17(a) illustrates a number of crops 136 planted in the ground 100, which are spread out with respect to each other, such that a space is provided between each.

FIG. 17(b) illustrates a device denoted by reference numeral 150, having legs 116 which are provided with a buckling foot 148 at the end which engages with the ground.

FIG. 17(c) illustrates that as the weight of the device 150 is release to the ground 100, each foot 148 buckles. Thus whereas each foot has an initial small footprint as shown in FIG. 17(b), as the weight of the device is taken by the legs this footprint increases as each foot buckles. As each foot buckles, it may apply a force to push out an adjacent crop (see arrows of FIG. 17(c)). Each foot may be considered an expanding foot. Rather than buckling, a foot may expand in the horizontal directions as the weight of the device is released on landing.

With reference to FIG. 18 there is illustrated an exemplary arrangement for a leg.

FIG. 18 illustrates an arresting leg for landing. The device 150 is shown as having legs (which may be supporting legs for standing) 156. A leg 154 touches the ground first as the device lands. A further leg 156 is provided to prevent 'tipping over' in another direction. This leg may be positioned opposite the arresting leg, or anywhere around the device. There may be multiple such legs.

The device hops or jumps between stationary positions on the ground. The device thus has two general modes of operation. In one mode of operation the device is operational to travel between a start and an end point, being stationary at both the start and end points. In a second mode of operation the device is configured to operate when stationary to perform an operation to support remote monitoring and/or remote action. There is additionally a third mode of operation of the device, in which it may be configured when stationary to dock and/or interface with a control system, as will be described below.

The first mode of operation is travel between an end and a start point. In the travel mode of operation the device must: (i) take off (or hop or launch); (ii) fly; and (iii) land.

The take-off part of the first mode of operation itself has three phases, which are illustrated with reference to FIGS. 6(a) to 6(c).

Figure 6A:
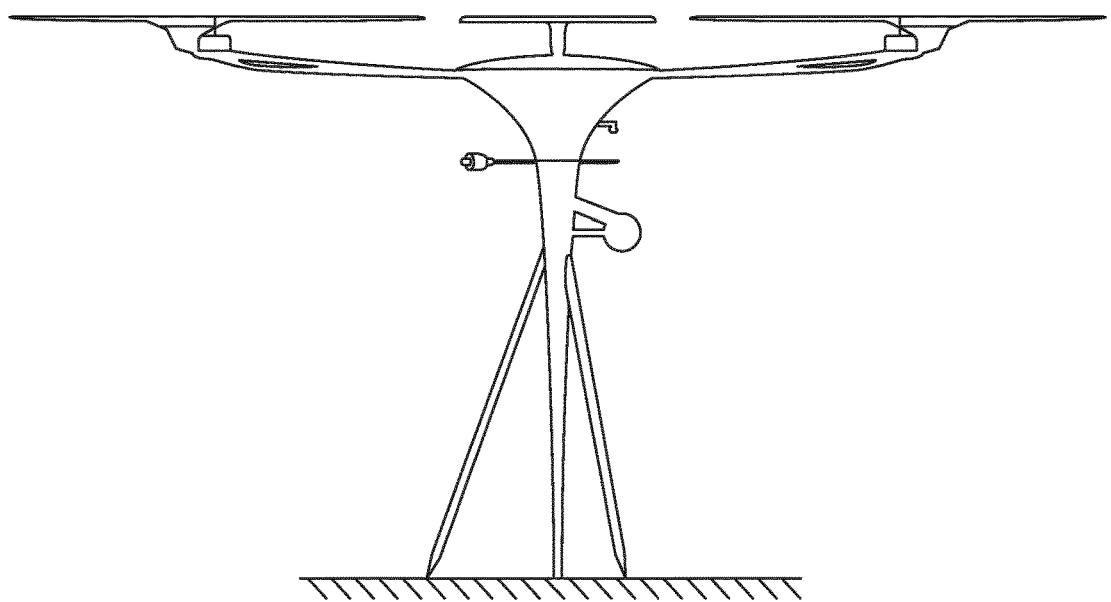

As shown in FIG. 6(a), prior to take-off the device 1 is a state where it is performing the second mode of operation (described below), with the plane of the propellers generally parallel to the ground.

Figure 6B:
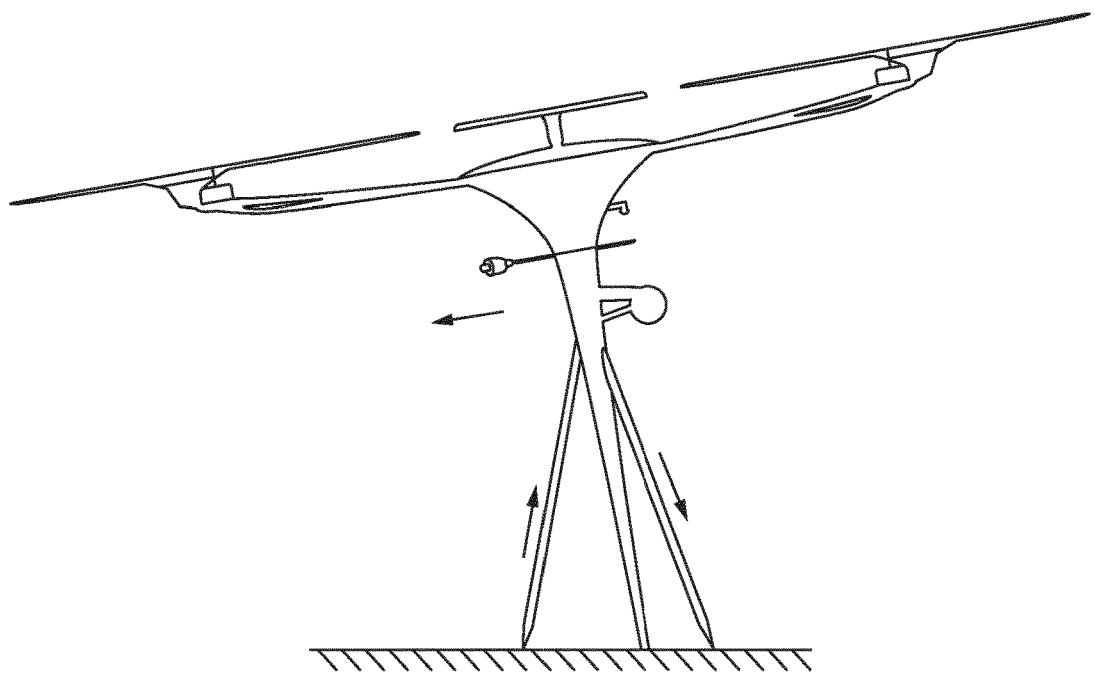

As shown in FIG. 6(b), the tripod legs 6a to 6c are controlled when the device is to be moved to a next location. The control circuitry 30 of the device 1 knows the location to which the device is to move. The next location is not an arbitrary location, it is a precise location. Based on the position of the next location relative to the current location, the telescopic legs (not all of them, may be only one or two of them), or may be retracted in order to angle the device 1 towards the next location. The device 1 is thus orientated toward the next location.

Figure 6C:
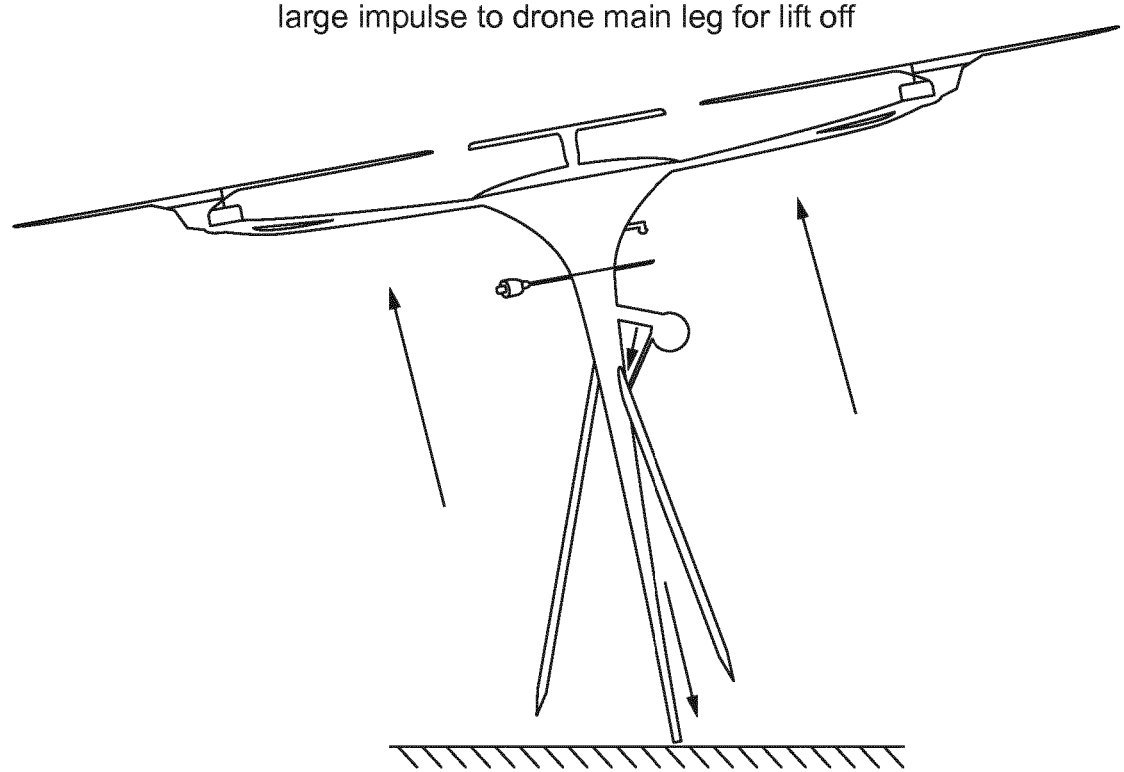

As shown in FIG. 6(c), the spring mechanism is then deployed and activated, in order to launch or jump the device 1 toward the next location. This provides a large impulse for the stalk 4 of the device 1 to lift off, and the device is launched or takes off generally in the direction of the next location.

The launch mechanism is preferably used to get the device airborne. In addition to getting the device airborne, the device is preferably launched in the direction of the next destination point, with the speed and angle of the launch being appropriately controlled. This launch may take into account wind speed and direction. The launch preferably gets the device airborne and traveling in the correct direction quickly. The launch preferably gets the device airborne and travelling stably in the correct direction. The launch preferably gets the device airborne in such a manner that its flight is less susceptible to wind, dust or crop (for example) hitting the propellers. This may involve launching the device to a higher altitude than would otherwise be required, for example.

Where a leg is used to launch the device by jumping, the leg is preferably located behind the centre of gravity of the device, in the direction of the jump. That is the leg is located on the side of the centre of gravity which is opposite to or away from the direction of jump.

Preferably the device has ¾ stability legs, and one extra leg to provide the launch/jump.

The body of the device, or housing, may be rotatable, so as the housing can be rotated to re-orientate the jumping leg (which may be affixed to the housing).

The body/housing may be rotated with the jumping leg retracted/raised. The jumping leg thus does not get in the way as the body/housing is rotated.

The device may include an active or passive impulse damper which, as a resilient mechanism associated with launch is released, spreads the acceleration of the jump over a longer period of time. This ensures that a leg (or other mechanism) being used for the launch does not push into or penetrate the ground, or slip, which would cause energy loss.

After the launch, the propellers take over to take the device to its destination point. Thus, after this take-off or launch operation, the propellers of the device are used in order to navigate the device 1 to the next location. The device 1 thus operates as a drone during this period of movement.

The next location is known to the device 1 from a pathway for operation, as discussed below, and the processor 32 is configured to control the motors associated with the propellers using the motor control and management module 60 to navigate the device 1 to the next location.

The device operates in a free-flight mode between the launch location and the landing location.

The propellers guide the device to the landing spot, and after navigating to the next location, the processor 32 is configured to control the motors associated with the propellers using the motor control and management module 60 to land the device 1. In an appropriately equipped device, the device 1 lands on the stalk 4 and the tripod legs 6a to 6c are appropriately deployed as discussed above.

In general, the objective of the landing phase is to bring the device to touch down on a landing spot without falling over. Preferably during landing the device has zero forward velocity, and this is optimally achieved by switching off the propellers in the air. The order in which the propellers is turned off may be controlled to take into account prevailing wind conditions, and to allow for wind drift. The harder the device hits the ground, the less power has to be used to slow the device down before landing. Legs provided on the device act as shock absorbers when the device is then landed.

On landing, the device may make a comparison between the location in which it has landed, and the intended location for landing. The device legs may be actuated to move the device along the ground, in order to position the device at the intended location, if it has not landed at the intended location. This actuation of the legs is to readjust the position of the device, and the legs do not provide for continuous walking of the device.

The device may be adapted to follow a path within the area, moving from point to point, and flying or hopping between points. The points, and path between points, may be present, and the controller within the housing may control the device to move between the points.

The distance between hops—or positions at which the device launches and lands—will vary in dependence on the mission and implementation, but may for example be in the range of 2 m to 10 m. The device may thus be required to travel 2 m to 10 m.

The exemplary device 1 of FIGS. 1(*a*) to 1(*d*) includes a spray nozzle 22 mounted on rotatable arms 12,14.

The rotatable arm 12, 14 is configured to rotate about the device 1, and in practice rotates about the housing/stalk integral unit. The rotatable arm 12, 14 may rotate 360° about the device 1, and the spray nozzle 22 mounted at the end of the rotatable arm may be controlled so it can be orientated upwards and downwards. The rotatable arm 12, 14 for the spray mechanism may be telescopic.

The rotatable arm 12, 14 and the spray nozzle may be controlled by the spray nozzle control and management module 14 of the control circuitry 30 of the device 1.

With reference to FIGS. 5(*a*) to 5(*d*) an alternative exemplary arrangement of a rotatable arm equipped with a spray arm having a spray nozzle is described. Reference is particularly made to FIG. 5(*b*) and FIG. 5(*d*).

As shown in FIG. 5(*d*), there is shown the arms 12,14 of FIGS. 1(*a*) to 1(*d*). In closer detail, these arms each extend from the housing 2 of the device to a distal end, and preferably are each of the same length. Thus if the arms rotate around the housing 2, the distal ends of the arms 12 and 14 rotate around the circumference of a rotation circle.

Because there are two arms, in order to give full 360° coverage for rotation, each arm only needs to rotate 180°. There could instead be provided just one arm which rotates through 360°, but the provision of the two arms requires each to rotate only through 180°. The rotation of each arm around 180° is indicated in FIG. 5(*d*) by dashed arrows 108 and 110 or each arm 14 and 12 respectively.

As can be seen comparing FIG. 5(*b*) with FIG. 5(*d*), each of the arms 12 and 14 is preferably (but not necessarily) telescopic. The telescopic functionality may be enabled by a motor. Preferably where the arms 12,14 are telescopic, they are controlled simultaneously so the radial length (relative to the central housing 2) of each arm is adjusted equally. This means that the arms can be retracted as shown in FIG. 5(*c*) for movement of the device between locations, and then may be extended as shown in FIG. 5(*d*) when stationary. When retracted the arms 12,14 are preferably substantially the same radial length as the rotor arms 19*a* to 19*d*.

As seen in the detailed view of FIG. 5(*b*), each arm 12,14 is a rotatable arm which is provided with a separate spray arm, respectively denoted by reference numerals 12*a*, 14*a*. Each of the spray arms 12*a*, 14*a* is connected to the respective rotatable arm 12, 14 by a hinge or pivot type element 12*c*, 14*c*. Each spray arm can thus be deployed to rotate or swivel through 90°, as shown in FIG. 5(*d*), to deploy the end of the spray arm distal to the hinge or pivot 12*c*, 14*c* toward the ground. The distal end of each spray arm 12*a*, 14*a* is provided with a respective spray nozzle 14*b*, 14*c*, for spray of a weed killer spray for example. The spray arms 14*b*, 14*c* permit the spray nozzle to be deployed close to the point of desired application of the spray.

The spray arms may move in a radial direction from the housing 2, as denoted by dashed arrows 104 and 106. The hinge or pivot points 12*c*, 14*c* may be fixed to the respective rotatable arms 12,14, and the spray arms may then move as the rotatable arms 12,14 are telescopically adjusted. Alternatively the spray arms 12*a*, 14*a* may be configured to move along the rotatable arms 12,14, so that the hinge or pivot points 12*c*, 14*c* move along the rotatable arms.

The spray arm may deploy any appropriate spray according to an implementation.

Although two spray arms are illustrated, any number of spray arms may be deployed, for example four spray arms. In general one or more spray arms may be deployed.

Although the illustrated arrangement shows the spray arms as being rod-type structures which are deployed by dropping them down through 90°, they are not limited to such an arrangement. They may, for example, be formed of concertina type structures, so that they can be opened to expand towards the ground, and closed to contract towards the support arm. The arms thus, in such a concertina-type configuration, can be understood as operating similar to a car-jack.

In the foregoing it is described that the arms 12*a*, 14*a* are spray arms equipped with spray nozzles 14*a*, 14*b*. In practice, the arms 12*a*, 14*a* may serve other purposes, and nozzles may not be provided. For example the arms 12*a*, 14*a* may be provided with weed wipes or sponges at points 12*b*, 14*b* for applying a weed killing chemical by application rather than spray. The device is thus not limited to the provision of a spray. A weed wipe may be a sponge with a tube going into it (along the 'spray' arm).

Weed wipes of sponge deployment can be advantageous in reducing the amount of liquid needing to be carried by the device. As little as a hundredth to a twentieth of the liquid may be needed in comparison to the liquid needed for spraying.

As noted one or more spray arms may be deployed, and therefore one or more arms associated with a weed wipe or sponge may similarly be deployed.

Where a weed spray or a weed wipe is provided, a reservoir of weed fluid may be provided in the device.

The exemplary device 1 of FIGS. 1(*a*) to 1(*d*), FIGS. 4(*a*) to 4(*b*), or FIGS. 5(*a*) to 5(*d*) includes the camera 10 on the rotatable element 8, such that the camera 10 may rotate 360° about the device 1, and in practice rotates about the housing/stalk integral unit. The camera may also be orientated upwards and downwards. The rotatable arm for the camera may be telescopic. The camera may thus be controlled by the device to sense in the x,y,z plane.

The rotatable element 8 and the camera 10 may be controlled by the camera control and management module 62 of the control circuitry 30 of the device 1.

Alternatively the cameras may be deployed on arms similar to those on which the weed spray devices are provided. Thus independent arms may be provided with a rail system along which cameras may move, in order to carry out sensing. The cameras may be provided in situ with the weed killer nozzles. Such an arrangement of a camera on a rail being deployed along the rail may apply to devices other than the specific device shown and described.

A spray nozzle or a camera may be provided on a telescopic arm, and may move up and down the telescopic arm. The arm supporting the spray nozzle and/or camera and/or any other device may be line with or attached to a rotor arm.

The exemplary device 1 of FIGS. 1(*a*) to 1(*d*) includes the set of solar panels 16*a* to 16*d* each of which is connected to the housing by the respective panel support arm 17*a* to 17*d*. The solar panels 16*a* to 16*d* are used to generate energy to power the control circuitry 4, and the various electrical components of the device 1, and to power the movement of the device or at least to preferably contribute towards the power for the movement of the device.

The solar panels 14*a* to 14*d* are controlled by the energy control and management module 58 of the control circuitry 30 of the device 1.

It will be understood that the configuration of solar panels as shown is exemplary, and any suitable deployment of solar panels on the device, or other mechanism to capture solar energy for use on the device 1, may be utilised.

The device of FIGS. 5(a) to 5(d) shows an alternative configuration of solar panels. Instead of the four distinct panels 16a to 16d of FIGS. 1(a) to 1(d), there is provided a single panel 120 which sits as a 'platform' over the device housing 2. The panel is provided with four distinct areas in this arrangement in which solar panels are deployed, but it will be understood that the design of the panel is exemplary.

The use of the device is not restricted to the use of solar energy. Rechargeable batteries may be used in addition to, or instead of, solar energy. The provision of power to the device is discussed further hereinbelow. Thus in some embodiments the device may have no solar panels.

Where a rechargeable battery is utilised, with current technologies a device 1 may operate for around 4 hours. A used battery may be dropped out and replaced with a fully charged one, to give 8 hours of operation. Each battery is recharged when another battery is in use. An 8 hour operation may be sufficient operation in a 24 hour period, and therefore each device may be provided with two rechargeable batteries, which are used for 4 hours each and recharged within the remainder of a 24 hour period. Of course use and recharge of batteries will be dependent on available battery technology, and desired operational time in a 24 hour period.

Where batteries are used, a network infrastructure may also be used (as described further hereinbelow) which facilitates battery replacement and recharge.

In general, the energy control and management module 58 of the control circuitry 30 of the device 1 is used to control the provision of energy or power to the device 1.

The exemplary device 1 of FIGS. 1(a) to 1(d), 4(a) and 4(b), and 5(a) to 5(e), includes the set of propellers 18a to 18d, each of which is connected to the housing by the respective motor arm 19a to 19d. The propellers are activated to move the device 1. By powering the propellers the device becomes airborne, and may then be flown (or hopped) to another location where it can be landed.

The propellers 18a to 18d are controlled by the motor control and management module 60 of the control circuitry 30 of the device 1.

It will be understood that the power is delivered to the propellers to assist the device to take off, to fly/move the device, and to assist the device to land. This will be described further hereinbelow.

In embodiments, the take-off of the device, or the main energy for the take-off of the device, is provided by alternative means as discussed. The propellers are then used for flight of the device and/or landing of the device.

The device 1 may be a modular device, being able to connect to different modules to perform different functions. The modular functionality may be provided by an apparatus module or a software module.

A device may be able to navigate to a point within a location to attach a modular device. A hardware module may be fitted by an operator, or the device may be equipped to dock with a modular connection device as appropriate, in order to automatically acquire and fit the appropriate module. For example, a device 1 can attach a modular apparatus such as:

A modular electrocution device, for electrocuting weeds.
A modular ground penetrating radar.
A humidity probe.
A temperature probe.
A modular camera (of a variety of types).

Figure 5D:
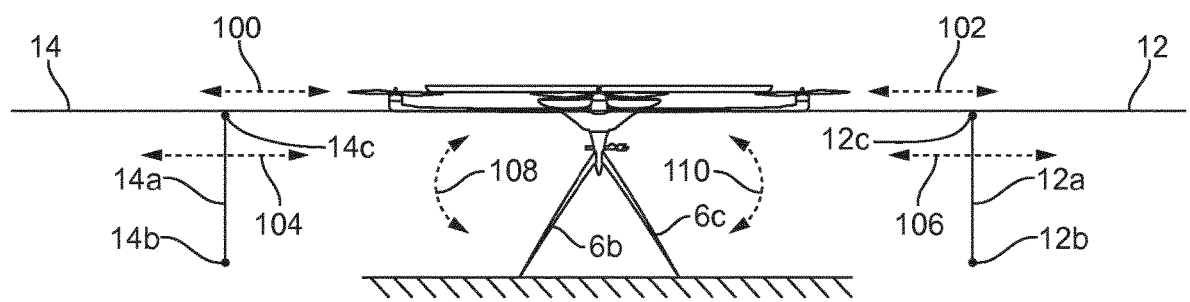
Figure 5E:
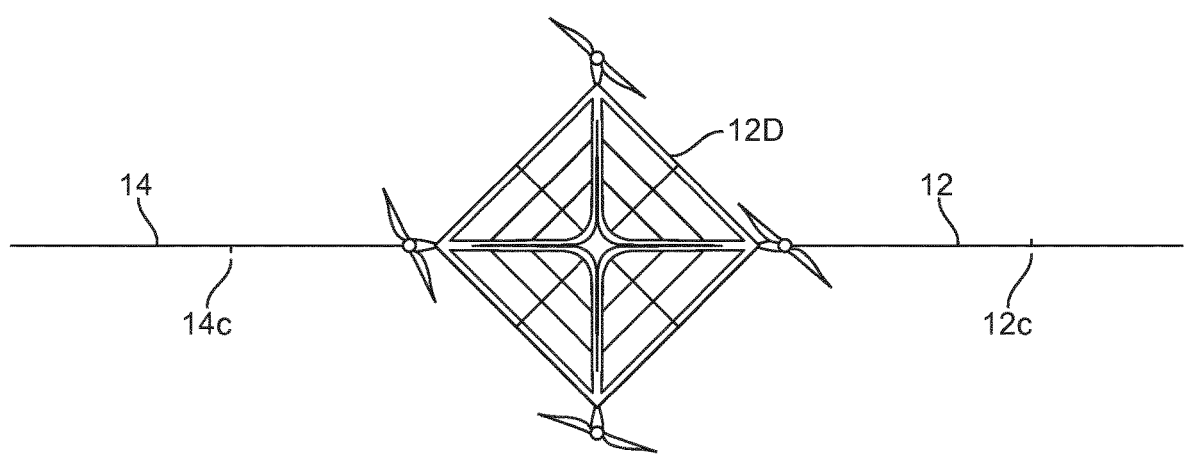

For example, a ground penetrating radar module may be deployed at the end of the 'spray arm', in place of the spray nozzle (12b, 14b of FIG. 5(d)). When the 'spray arm' 12a, 14a is deployed by being 'dropped', the ground penetrating radar may be operated. Similarly, humidity or temperature probes may be deployed.

A device 1 may be able to download different software to allow different functionality to be carried out. Should the device memory be limited, this software may be downloaded to overwrite other modular software, with each modular software being associated with a specific functionality. The device may be configured to download a software module wirelessly, over WiFi or a mobile phone network, or may be configured to dock with a module to download the software module.

For example, a device 1 can download modular software such as:

Software to find a path.
Software for a waypoint for that path.
Software instructions for the device to go to a specific path point.

As appropriate, an additional module may be added to the set of modules 66 of the control circuit 30 to provide control for the hardware or software module.

Device modularity may allow different cameras, utilising different camera technology, to be used.

Device modularity may allow devices such as a UV (ultraviolet) light to be carried by the device 1, or the device 1 could carry a torch or lamp, or other illumination means. This may be carried in conjunction with the camera being carried, or may be an integral part of the camera being carried. The ability to carry an illumination means allows the device to operate at night time, allowing night time working. The device may therefore be operational throughout a 24 hour period, and continuously through such period, subject to suitable battery deployment, or a suitable battery recharge infrastructure.

When used for weed killing, the device is not limited to spraying or deployment of weed wipes or similar, the device may be fitted with a modular unit to allow snipping, drilling or pulling of weeds for example.

The modular connection device may support the exchange of rechargeable batteries. A rechargeable battery may be removed or attached/inserted at a modular connection device. A rechargeable battery may be connected to the device using a magnetic mechanism.

A single modular connection device may provide all modular operation functionality, or modular operation functionality, or modular connection devices may be specific to a particular function, such as a recharging function.

A further discussion of the operation of the device to allow such modularity to be supported is described below.

A device as described, which as noted above may also be described as a robot or drone, may be utilised to service an area, such as a field. The device of FIGS. 1(a) to 1(d) is exemplary, and is shown as configured with appropriate peripheral functionality to be used as a crop sprayer in a farm type environment. For example the camera is used to capture images to identify weeds, and then the spray arm is used to deploy weed killer.

Figure 7:
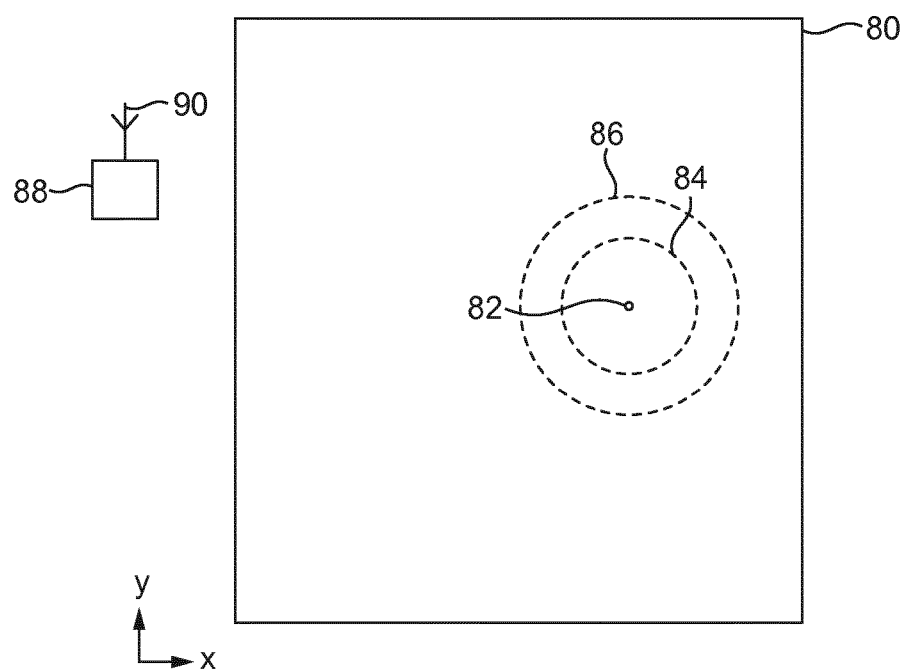
FIG. 7 illustrates schematically a deployment area of an exemplary device.

An apparatus such as device 1 is preferably deployed to monitor and/or take action in a geographical area 80 as denoted in FIG. 7. The geographical area may be any area of space, such as a field. The space is shown in FIG. 7 as having x and y dimensions, but in addition the space may have a z dimension. The x and y dimensions denote locations on the ground, whereas the z dimension may denote an altitude, which may vary if the area of ground is undulating or hilly.

Reference numeral 82 denotes a spot within the area 80 within which the device may be located. Also shown in FIG. 7 are two concentric circles illustrated by dashed lines. Each concentric circle 84 and 86 denotes a range of a peripheral module mounted on the device 1 at location 82. The concentric circle 86 denotes, for example, a range of the camera 10 as it rotates around the device 1. The concentric circle 84 denotes, for example a range of the spray nozzle 22 as it rotates around the device. In an example implementation the concentric circle perimeters 84 and 86 may be substantially coincidental.

As will be apparent from the above discussion, the concentric circle having circumference 84 may have a variable radius, coinciding with the telescopic operation of the associated arm. The concentric circle 86 may have a radius which is coincident with the maximum radius of the rotatable arm associated with the circumference 84.

A transceiver 88 may be provided adjacent to the area 80 to communicate with the device at location 82, and generally communicate with the device 1 at any location within the area 80. Alternatively several such transceivers 88 may be deployed such that the device 1 is in communication for all positions in the field, if all locations cannot be covered by one such device. The transceiver 88 may be provided for WiFi communication with the device, so that the device does not have to be equipped to communicate via a mobile phone network.

The device 88 may be connected to other similar devices such as device 88 which may provide communication to devices such as device 1 in other areas, and all such device 88 may be connected to a central controller. The central controller may receive all images captured by the device, and may transmit instructions to the device.

Preferably the device 1 works autonomously within the area 80 in accordance with transmitted or predetermined instructions.

In one example implementation the device may, when located in a position, use the fitted camera 10 to scan the area around the device. The captured images can be processed by the image processing module 52. The processing may process whether any weeds are identified in the image scan. If weeds are identified, then the nozzle 22 is deployed using the arms 12,14 to spray the weeds.

Following the deployment of the spray to the weeds in such a situation the device 1 moves onto another location, with the intention that the device 1 moves or hops between locations in the area 80 to allow the area to be fully scanned and treated.

Figure 8:
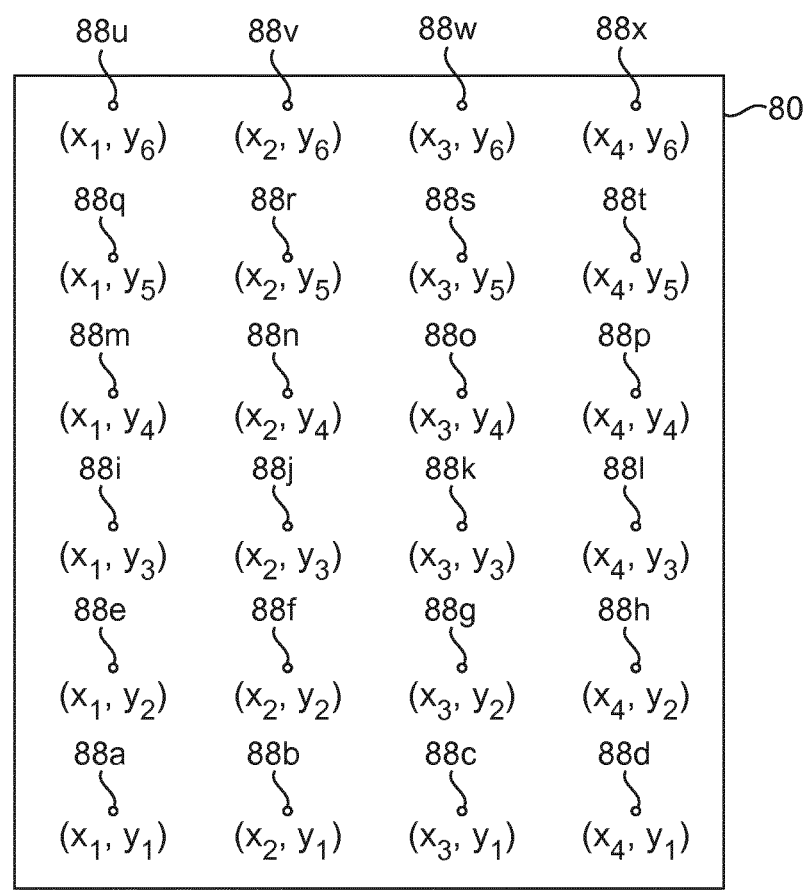
FIG. 8 illustrates schematically mapping of the deployment area an exemplary device.

Turning to FIG. 8, there is shown the area 80 with a plurality of locations within the area denoted by dots, each having an x,y coordinate. There are shown 24 dots, denoting 24 locations within the area 80, each denoted by a unique x,y coordinate: from $x_1, y_1$ to $x_4, y_6$, and each denoted from $88_a$ to $88_x$. The positions are determined as the positions which the device needs to be located at in order to fully allow the area denoted by reference numeral 80 to be assessed and treated. The device is arranged to be positioned at each of the 24 locations, and at each of the locations scan and treat the area. The device then needs to move between each of the 24 locations.

Figure 9:
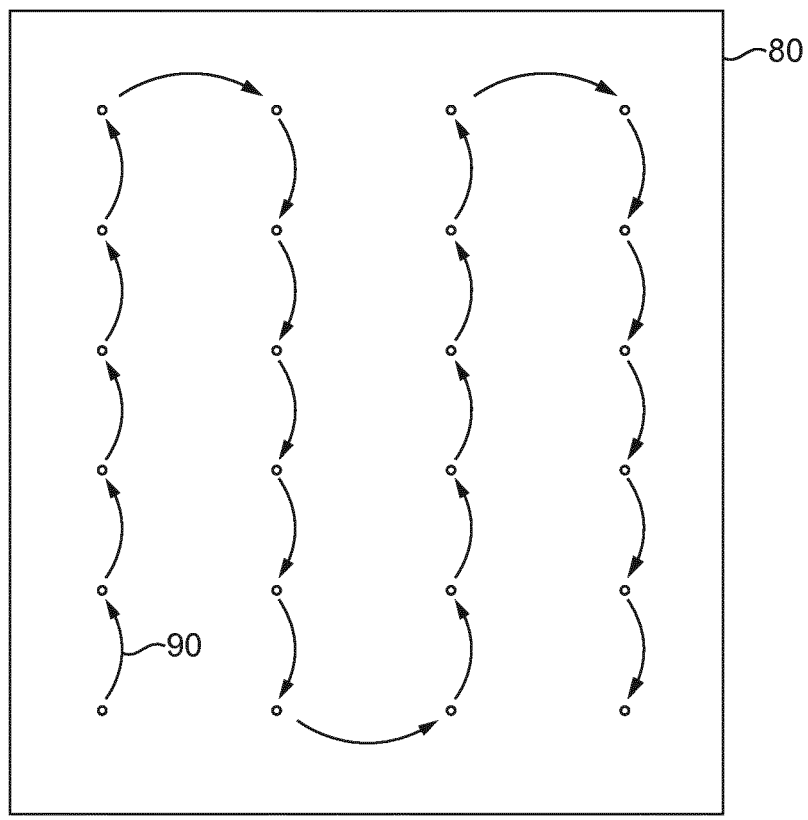
FIG. 9 illustrates schematically plotting of a pathway in the deployment area for an exemplary device.

With reference to FIG. 9, there is shown an example pathway between the points $88_a$ to $88_x$ (which may be considered waypoints) taken by the device 1, as denoted by the arrows 90. Each arrow denotes travel of the device between successive locations. As discussed above, the travel will comprise the device taking off or launching from a location, flying toward the next location, and then landing at that next location.

The device 1 thus autonomously hops between locations, and at each location carries out scanning and actioning as appropriate, in order to fully scan and action in the area 80.

The path as denoted by the arrows 90 may be predetermined, and may be pre-calculated by the processor 32 in order to determine the pathway for the device within the area 80. The processor 32 of the control circuitry 30 may utilise the pathway planning module 54 in order to determine the pathway through the area 8 as denoted in FIG. 9.

An area for the device to operate in may be identified, and then the path comprising a plurality of waypoints computed.

As discussed above, an area may be provided with docking stations, or interface points, to allow a device to travel or hop to, in order to change the modular peripherals of the device, or potentially to download modular software, or to exchange rechargeable batteries. Such interface points may be included in the path computation. For example an energy management system may include waypoints of interface points for accessing or recharging batteries.

Figure 10:
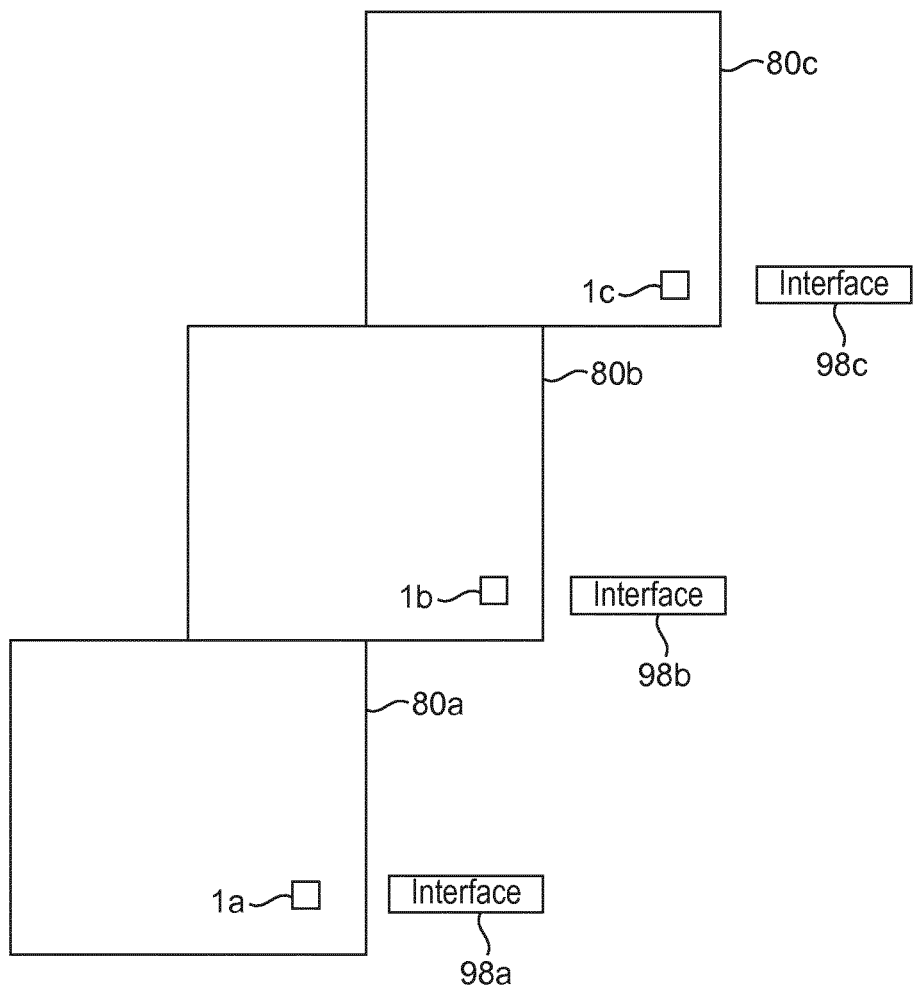
FIG. 10 illustrates schematically a deployment area comprised of multiple sub-areas.

As shown in FIG. 10, there is illustrated three areas 80a to 80c, each being worked by a device denoted by 1a to 1c respectively. Each area is associated with an interface location 98a to 98c respectively, which the device may move to or hop to in order to change the hardware peripherals or download software modules.

The interface devices 98a to 98c may provide points at which a device 1 can change its modular connections, for example to equip with a different camera. The interface devices 98a to 98c may also provide locations at which a device 1 can replace its battery, and at which used batteries may be placed on charge. The interface devices 98a to 98c may also be provided to enable additional testing of samples. For example a device may bring a sample (for example of a weed) to a sensor located at interfaces 98a to 98c, in order to test that sample. The interfaces 98a to 98c may also provide a location at which a chemical reservoir of the device, such as a reservoir of weed killer.

Additional devices (or robots) may be provide in order to service the devices 1. These additional devices may transport chemicals, modules or batteries to the devices 1 in the field.

A device 1 as described may be utilised in conjunction with space data.

Figure 11:
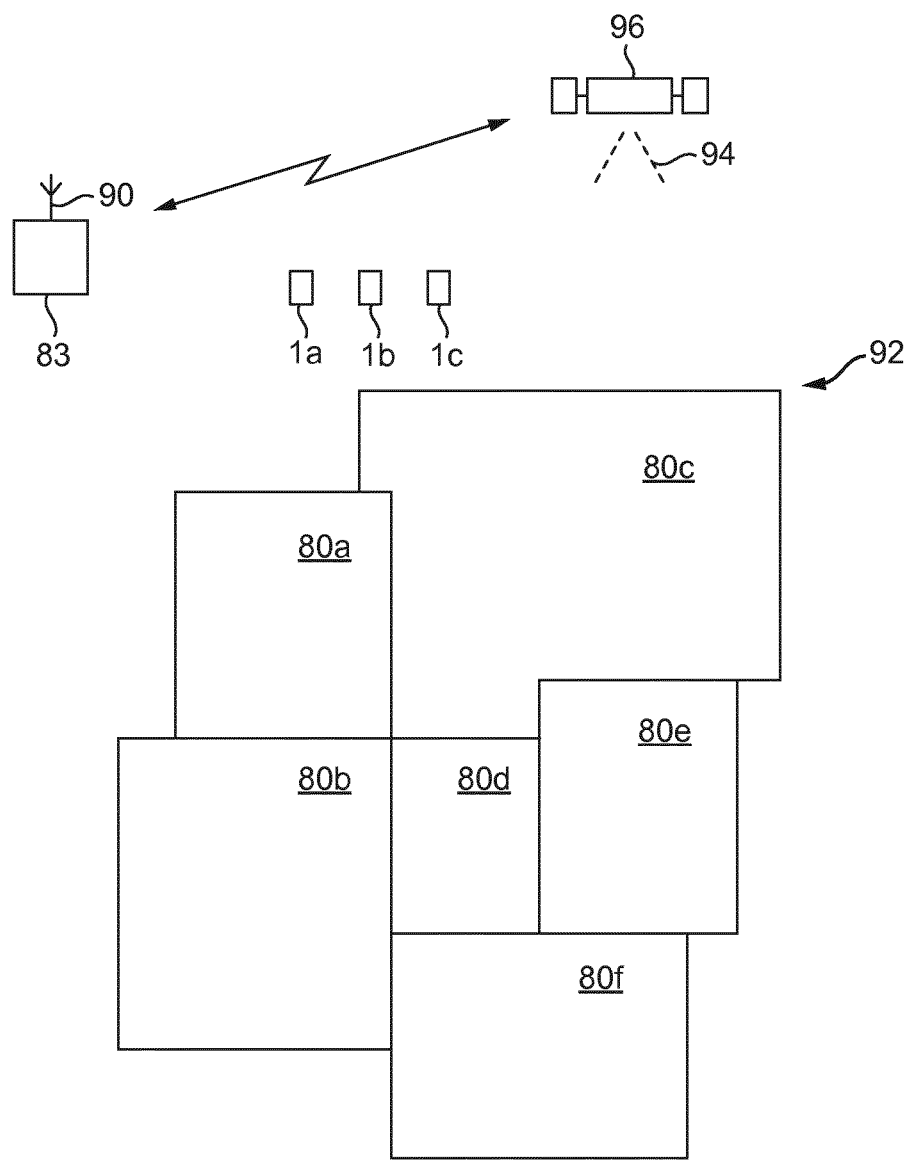
FIG. 11 illustrates schematically a system operation utilising satellite data.

As denoted in FIG. 11, there is denoted an area 92 which is generally divided up into multiple sub-areas 80a to 80f. A satellite 96 captures images of the earth as denoted by reference numeral 94, and provides those images to the transceiver station 88 having antenna 90, a control station associated with the transceiver station 88 for example.

The transceiver station 88, or a control centre associated with the transceiver station 88, is configured to scan those images provided by the satellite to look for particular signs. For example, the images may be scanned to look for images of areas of ground of 'poor health'. The areas 80a to 80f may denote the areas the images relate to.

In response to an analysis of the images, it is determined areas which need to be inspected and/or sprayed. Whilst the space data may identify an area which has been identified as having bad health, or requiring some form of investigation, the space data may not allow any indication of the reason for bad health.

Based on the space data, a controller may use the transceiver 88 to transmit instructions to one or more of a plurality of devices 1, as denoted by reference numeral 1a to 1c. Device 1a, for example, is deployed to inspect area 80a.

The device can then inspect that area in accordance with the previously described technique, hopping around the area to fully inspect it.

The device may be configured to just inspect that area, and may be able to identify the specifics of a problem that caused the space data to identify that area, and then the camera on the device can be used to identify, e.g. a fungus problem, a weed problem, a soil moisture problem, a pest problem etc.

The device may be configured, based on the space data, to inspect only a sub-part of the area with which it is associated. Returning to FIG. 9, for example, the device may be controlled to only inspect a sub-set of the locations shown, and not all of the locations.

The camera of the device can be used to take images, and relay these back to a control point. If the camera of the device identifies a weed, then it may automatically deploy the spray to the weeds without needing to wait for the camera images to be relayed for processing.

The device may use the images captured by its camera to alert a farmer of the specifics of a problem, and then the farmer can address the problem, or instruct the device to address the problem, e.g. by deploying a weed spray.

The device may use the images captured by its camera to relay this information back to an associated transceiver station 88, and/or a central control point, which transceiver or central control point can enhance or build on the provided satellite maps based on the locally captured images. Thus enhanced mapping is provided, which provides enhanced maps that may be utilised by other devices, robots or tractors.

When utilised with a satellite system, the device may not perform any scanning/inspection, utilising an on-board camera. The device may simply be controlled to perform an action based on the provided space data, and the images associated with the provided space data. The movement of the device can be controlled via GPS coordinates or such like, and the device moved to locations where the space data indicates action is needed. The combining of locally captured images, to enhance the space data, may however be advantageous.

The device may not perform any action, such as spraying, and may simply capture images for enhancing the space data.

The system may also provide a similar function of calibrating satellite data by using other similar ground sensing platforms, besides the device, for use in other environments such as water monitoring.

In particular, the device may be modified to enable it to perform water monitoring, so that it can enter and exit water to monitor such. Alternatively, the device may form part of a system which includes other devices which are configured to perform water monitoring, so the data monitored by both devices can be integrated.

A use of water monitoring may be to identify the presence and/or quantity of specific chemicals, such as chemicals associated with crop/soil treatment in an area. Based on the monitoring, it may be possible to identify the area (or farm) associated with the chemicals. This information may be integrated with satellite observation data associated with the water.

The system may also couple analyses through other platforms with the analysis having been done by the device, combining satellite data with ground sensing in a variety of environments, to understand how effects of one environment can lead to another.

Figure 12:
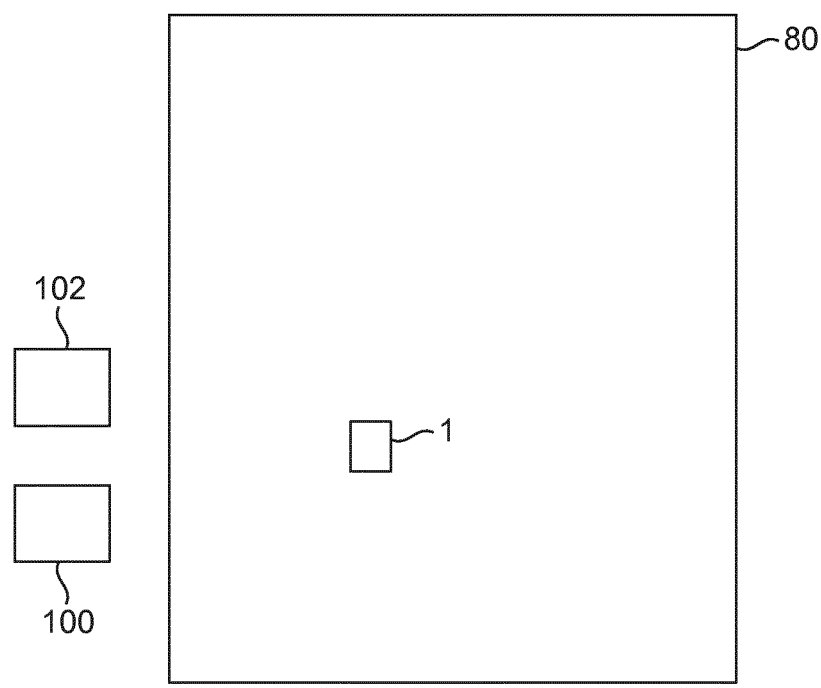
FIG. 12 illustrates schematically a deployment area with an associated charging infrastructure.

A device may be used to fly around an area in order to capture images of the area, either instead of utilising space data from a satellite, or in addition to using space data from a satellite. Referring, for example, to FIG. 12, the device 1 may take a fly-by of the area 80, in order to capture an image of the area 80. This may be done by the device flying at a low height. One or more cameras on board the device can then be used to image the area 80, and the images can be used (instead of or in addition to the satellite data) to map the area 80.

Ground tracking data may be used to calibrate satellite data. The device may provide local data, e.g. good data, to enhance the space data.

Earth observation (EO) is the gathering of information about the physical, chemical and biological systems of the planet via-remote-sensing technologies, supplemented by Earth-surveying techniques, which encompasses the collection, analysis and presentation of data. This collected data includes space data.

Earth observation data may inform the device, as described above with respect to space data.

A closed loop system may be provided in which the earth observation data is provide to control the device, and then the device is operated to enhance that earth observation data by, for example, utilising different sensors to accumulate data within an area.

In the above description it is set out that a device may be deployed within an area to monitor, inspect, or otherwise take action. In practice multiple devices may be deployed in a single area, with the devices communicating with each other either directly or through a central point such as a transceiver 88, to cooperate to cover an area.

A number of devices may be deployed in a given area—for example 20/30 devices may be deployed in a field. A Wi-Fi hotspot may be provided for all the devices to communicate with, rather than each device being configured with a communications device to communicate with a cellular phone network. This reduces costs associated with such communication.

A device may be configured to navigate towards hotspots, and include one or more locations within its preconfigured path within which communication with the hotpot will be possible. The pathway determined by each device may ensure that the start and end point of the pathway is within a Wi-Fi hotspot, but without requirements for the intervening points to be covered by Wi-Fi hotspot coverage.

Where multiple devices are deployed within the area, one of the multiple devices may be the master device for working that area, determine the pathways for all devices, and provide the pathway instructions/route to each individual device, including determine its own route.

An area within which a device may operate may be established with an energy infrastructure. This may particularly be utilised where the device utilises a rechargeable or replaceable battery source for at least part of its energy supply.

For example, the perimeter of the area may be provided with recharging points, with the devices being equipped with rechargeable power sources. The devices may be programmed to move between stationary positions in a path, and to move to a power source at points that they will need to be recharged.

The control processing circuitry within a device may be configured to determine a path within an area, based on knowledge of the locations of charging points within that area.

With reference to FIG. 12 there is illustrated an area 80 being worked by a device 1, with charging points 100 and 102 being provided adjacent to the area. The location of the charging points 100 and 102 may be known to the device, and be included in the pathway of the device in dependence on needs. For example the device may know the charging time available with the operations and actions of the device, and plot the pathway so that the device can travel to the charging device from a point close to the charging point at a point at which charging will be necessary.

The device may be part of an overall system for machine learning, which system is connected to a network to provide on-line access. The device may provide feedback into the system that, for example, an area of ground identified by satellite data as a yellow patch is weeds.

An intermediary system may create waypoints and send them to the device.

A device can be used to accumulate data, e.g. enhancing satellite data and earth observation data. The data accumulated by the device may be exported from the system of which the device is a part. A well-tuned set of data, or map, may be created and exported.

It will also be understood from the foregoing that there may be provided an infrastructure which not only allows for charging/recharging, but also allows for modular elements to be removed, affixed, and replace. These modular adjustments may be applied at the same points as provide the charging/recharging using the same devices, or at different points using different devices.

The described technique provides a system in which repeated visits by a device, such as robot device of the type described to a sector or filed may provide observations to build in-trait models.

In-field variations of these traits may be analysed and understood to show how close or how likely a phenotyping model is to be accurate.

The described technique may provide predictions of yield based on using both in-field measurements and phenotyping models.

There is thus described an arrangement providing a solar re-charging, jumping drone, which finds and kills weeds, collects data and interacts.

There is thus described an arrangement providing computer vision to locate weeds, and precisely target with a drone arm.

There is thus described an arrangement providing calibration of satellite data to assist, and for example apply fertiliser, detect diseases and fungus, and analyse soil.

There is thus described an arrangement providing self-managed operation of multiple devices, working all day in swarms.

There is thus described an arrangement providing a device having an arm control.

The technique as described allows multiple uses, finds all weeds efficiently, and significantly reduces chemical costs.

Next generation of the device may be tractor mounted, organic friendly, and use data aggregation.

The device and system may be further enhanced.

Live feedback of ground-data such as weather may be used to optimise the pathway, based on long-range hopping and well as live earth observation data.

Wind conditions may be taken into account in determining the pathway, to determine waypoints and trajectory at least partly in dependence thereon.

Obstacle avoidance may be utilised to ensure a continuous hopping trajectory.

Artificial intelligence may be utilised to build up knowledge for use in defining pathways.

The captured image data may be used to recalibrate weed targeting. Live feedback may be used to readjust or recalibrate.

The creation of a map may be used to create a map larger than the area which the device operates over. The area which the device operates over may be of interest in mapping/assessing neighbouring areas.

The invention has been described with reference to various examples and embodiments, but is not limited to specifics given. Various examples and embodiments described may be combined, and various examples and embodiments as described may be implemented without specific details as presented.

The invention claimed is:

1. An autonomous remote device for deployment in an area, comprising:
   a mechanism for launching the device airborne from a first locations;
   a mechanism for navigating the device when airborne to a second location; and
   a mechanism for landing the device to a stable position at the second location,
   wherein the mechanism for launching the device includes a launching leg which during navigation and landing is retracted, and during take-off is deployed such that the launching leg provides a spring-effect for the device on take-off, wherein after landing the launching leg is orientated such that when the launching leg is deployed, the launching leg has a point of contact with the ground which is opposite the direction in which the device is to be launched.

2. The autonomous remote device of claim 1, wherein the deployment comprises monitoring at each stable position, the device further comprising: an image capture device for capturing images at each stable position; a sensor device for sensing data at each stable position; a deployment mechanism for deployment at each stable location and associated with an action, one or more rotors, wherein the mechanism for navigating the device and the mechanism for landing the device utilises the rotors; a set of legs for use in the stable position and adjustable to orientate the housing.

3. The autonomous device of claim 1 further comprising an anchor leg extending from a housing perpendicularly, wherein on landing the device lands on the anchor leg.

4. The autonomous device of claim 1, wherein the autonomous device repeatedly visits an area to build up observations in the area, which observations are compared with a phenotyping model to determine the accuracy of the model.

5. The autonomous device of claim 1 wherein the launching leg is movable between a first position in which the launching leg is retracted toward a housing of the device, and a second position in which the launching leg is positioned for launch of the device, wherein in the second position the launching leg extends between a first end connected to the housing, and a second end contacting the ground and wherein in the first position the second end does not contact the ground.

6. The autonomous device of claim 1 further comprising a rotatable housing to which the launching leg is fixed, wherein the launching leg is rotated by rotating the housing.

7. The autonomous device of claim 1 wherein the launching leg is provided with a non-slip means at one end thereof.

8. The autonomous device of claim 1 further comprising a plurality of stability legs, which support the device when positioned on the ground, wherein the launching leg is positioned in order to provide the take-off force for launch whilst the device is supported on the ground by one or more of the plurality of stability legs.

9. The autonomous device of claim 1 wherein the landing mechanism comprises a plurality of flexible legs adapted to absorb the force of landing, wherein landing comprises disengaging the mechanism for navigating the device and dropping the device to the ground.

10. The autonomous device of claim 1, wherein the landing mechanism is a mechanical mechanism which is not powered.

11. The autonomous device of claim 1 wherein the landing mechanism includes a leg which is orientated in the direction of flight during the flight, such that on landing the leg engages with the ground to prevent motion in the direction of flight.

12. The autonomous device of claim 1 further comprising a mechanism for self-righting the device on landing.

13. The autonomous device of claim 12 wherein the self-righting mechanism is provided by one or more legs being of an adjustable length.

14. The autonomous remote device of claim 1 further configured for use in an agricultural environment.

15. The autonomous remote device of claim 1 further comprising a set of legs which arrest the flight instead of motors.

16. The autonomous remote device of claim 1 further comprising a non-slip protrusion on a leg which includes multiple feet which may be changed for better distribution of force in varying soils or terrains and minimisation of crop damage.

17. The autonomous remote device of claim 16 which can be adjusted in direction for optimal take-off and contact with terrain.

18. A method for deployment of an autonomous remote device in an area, comprising:
   launching the device airborne from a first locations;
   navigating the device when airborne to a second location;
   landing the device to a stable position at the second location,
   wherein the mechanism for launching the device includes a launching leg, the method further comprising:
      retracting the launching leg during navigation and landing; and
      during take-off deploying the launching leg such that the launching leg provides a spring-effect for the device on take-off; and
   orientating the launching leg after landing such that the launching leg will have a point of contact with the ground on deployment for launching which is away from the direction in which the device is to be launched.

* * * * *